United States Patent
Ohmori et al.

(10) Patent No.: US 7,353,543 B2
(45) Date of Patent: Apr. 1, 2008

(54) CONTENTS DISTRIBUTION SYSTEM

(75) Inventors: Motoji Ohmori, Osaka-fu (JP); Masataka Minami, Arcadia, CA (US); Masaya Yamamoto, Osaka-fu (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 698 days.

(21) Appl. No.: 10/339,567

(22) Filed: Jan. 10, 2003

(65) Prior Publication Data
US 2004/0139338 A1 Jul. 15, 2004

(51) Int. Cl.
*G06F 7/04* (2006.01)
*G06F 12/14* (2006.01)
*H04L 9/32* (2006.01)

(52) U.S. Cl. .................. 726/29; 726/30; 713/193; 705/55

(58) Field of Classification Search .......... None
See application file for complete search history.

(56) References Cited

U.S. PATENT DOCUMENTS

| | | | |
|---|---|---|---|
| 6,249,771 | B1 | 6/2001 | Kurihara |
| 6,834,348 | B1 | 12/2004 | Tagawa et al. |
| 2002/0026424 | A1 | 2/2002 | Akashi |
| 2002/0083282 | A1* | 6/2002 | Yoshino et al. ........... 711/163 |
| 2002/0138733 | A1* | 9/2002 | Ishibashi et al. .......... 713/176 |
| 2002/0169971 | A1* | 11/2002 | Asano et al. ............. 713/193 |
| 2002/0184492 | A1 | 12/2002 | Hori et al. |
| 2003/0009681 | A1* | 1/2003 | Harada et al. ............ 713/193 |
| 2003/0072453 | A1* | 4/2003 | Kelly et al. ............. 380/278 |

FOREIGN PATENT DOCUMENTS

| | | |
|---|---|---|
| CN | 1274461 | 11/2000 |
| EP | 1 018 733 | 7/2000 |
| EP | 1 338 989 | 8/2003 |
| JP | 08-037506 | 2/1996 |
| JP | 10-116472 | 5/1998 |
| JP | 2000-187935 | 7/2000 |
| JP | 2002-073421 | 3/2002 |
| JP | 2002-512412 | 4/2002 |
| JP | 2002-372910 | 12/2002 |
| WO | 99/55055 | 10/1999 |
| WO | 01/41359 | 6/2001 |
| WO | 02/35414 | 5/2002 |

\* cited by examiner

*Primary Examiner*—Emmanuel Moise
*Assistant Examiner*—David J. Pearson
(74) *Attorney, Agent, or Firm*—Wenderoth, Lind & Ponack, L.L.P.

(57) ABSTRACT

A contents supply apparatus supplies sub-content that relates to main content. A DVD-ROM stores a bind key unique to the DVD-ROM and main content that is a digital work. A main player reads the bind key from the DVD-ROM, acquires sub-content that relates to the main content stored on the DVD-ROM, generates encrypted sub-content by encrypting the acquired sub-content based on the read bind key, and writes the generated encrypted content to an SD memory card. A sub-player reads the bind key from the DVD-ROM, reads the encrypted sub-content from the SD memory card, generates sub-content by decrypting the read encrypted sub-content based on the bind key, and plays back the generated sub-content.

9 Claims, 17 Drawing Sheets

SUB-CONTENT ACQUISITION

PLAYBACK BY THE SUB-PLAYER

CONTENTS DISTRIBUTION SYSTEM

BACKGROUND OF THE INVENTION (1) Field of the Invention

The present invention relates to a technique for distributing digital contents.

(2) Description of the Related Art

Recording media such as DVDs on which digital works such as movies and music are recorded are becoming widespread. Recording media such as DVDs have a large amount of information digitally recorded thereon, and therefore can be used semipermanently without deterioration.

A large market has been built by the evolution of businesses that use such recording media to sell and/or rent out recording media on which movies and music are recorded. Prevention of illegal use of digital works recorded on recording media is crucial for such businesses.

Japanese patent No. 3073590 discloses an electronic data protection system that aims to prevent illegal use of computer software, electronic publications and the like stored on recording media.

This electronic data protection system protects electronic data stored on a recording medium that is used in a user apparatus, based on usage permission from an apparatus held by a usage permitting party. The recording apparatus stores a medium unique number that uniquely specifies the encrypted electronic data and the recording medium. The usage permitting apparatus includes a decryption key for decrypting encrypted electronic data stored on the recording medium, a permission information generation unit that, based on the medium unique number stored on the recording medium, encrypts the electronic data decryption key and generates permission information, and a writing unit that writes the permission information generated by the permission information generation unit to the recording medium. The user apparatus includes a reading unit that reads the permission information, the encrypted electronic data and the medium unique number from the recording medium, a decryption key generation unit that, based on the medium unique number, decrypts the permission information and generates the electronic data decryption key, and an electronic data decryption unit that, based on the electronic data decryption key generated by the decryption key generation unit, decrypts the encrypted electronic data.

According to such a structure, an electronic data protection system can be obtained that enables the user apparatus to use only encrypted electronic data that is stored on a legitimate storage medium and whose usage has been permitted by the usage permitting apparatus.

Furthermore, the abstract published in International Publication Number WO 00/63860 (International publication date: Oct. 26, 2000, International application number: PCT/US00/10414) discloses the following technique.

A system, method and article of manufacture is provided for tracking the distribution of content electronically. First, an electronic storage medium tracking identifier is incorporated onto an electronic storage medium and stored on a database. Next, a package tracking identifier is situated onto a package in which the electronic storage medium is stored. The electronic storage medium is then tracked while being shipped between various entities using the tracking identifier on the package. Further, the electronic storage medium may be identified using the tracking identifier on the electronic storage medium in order to afford authorized use of the information contained on the electronic storage medium.

Since various techniques such as those described above have come to enable prevention of illegal usage of contents written to recording media, businesses that rent and/or sell such recording media are expanding.

However, recently sub-content that relates to content recorded on a recording medium is being distributed in a manner other than on a recording medium. An example of sub-content is a preview for the sequel of a movie recorded on the recording medium. The preview is distributed to users via the Internet or the like.

However, while the above-described techniques for preventing illegal usage of content can prevent illegal usage of the content written to the recording medium, there is a problem that such techniques cannot prevent illegal usage of sub-content that relates to the content written to the recording medium that are distributed via another distribution path.

SUMMARY OF THE INVENTION

The object of the present invention is to provide a contents distribution system, a contents recording apparatus, a contents playback apparatus, a contents recording method, a contents playback method, a computer program and a recording medium with an object of preventing illegal usage of sub-content that relates to main content recorded on a portable ROM medium.

In order to achieve the stated object, the present invention is a contents distribution system that distributes sub-content that relates to main content, and is composed of a contents supply apparatus, a contents recording apparatus and a contents playback apparatus.

The contents supply apparatus outputs sub-content that relates to main content. A ROM medium stores unique information that is unique to the ROM medium, and a digital work. The contents recording medium reads the unique information from the portable ROM medium, acquires the sub-content that relates to the main content stored on the ROM medium, encrypts the acquired sub-content based on the read unique information, to generate encrypted sub-content, and writes the generated encrypted sub-content to a portable semiconductor memory.

The content playback apparatus reads the unique information from the ROM medium, decrypting the encrypted sub-content based on the read unique information, to generate playback sub-content, and plays back the generated playback sub-content.

Due to this structure, the contents playback apparatus plays back the sub-content only when both the ROM medium and the semiconductor memory are mounted in the contents playback apparatus. This means that the sub-content on the semiconductor memory cannot be played back if a ROM medium purchased by a another party is mounted in the contents playback apparatus together with the semiconductor memory. Consequently, protection of sub-content can be improved.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

1. First Embodiment

The following describes a contents distribution system 1 as one embodiment of the present invention.

1.1 Structure of the Contents Distribution System 1

Figure 1:
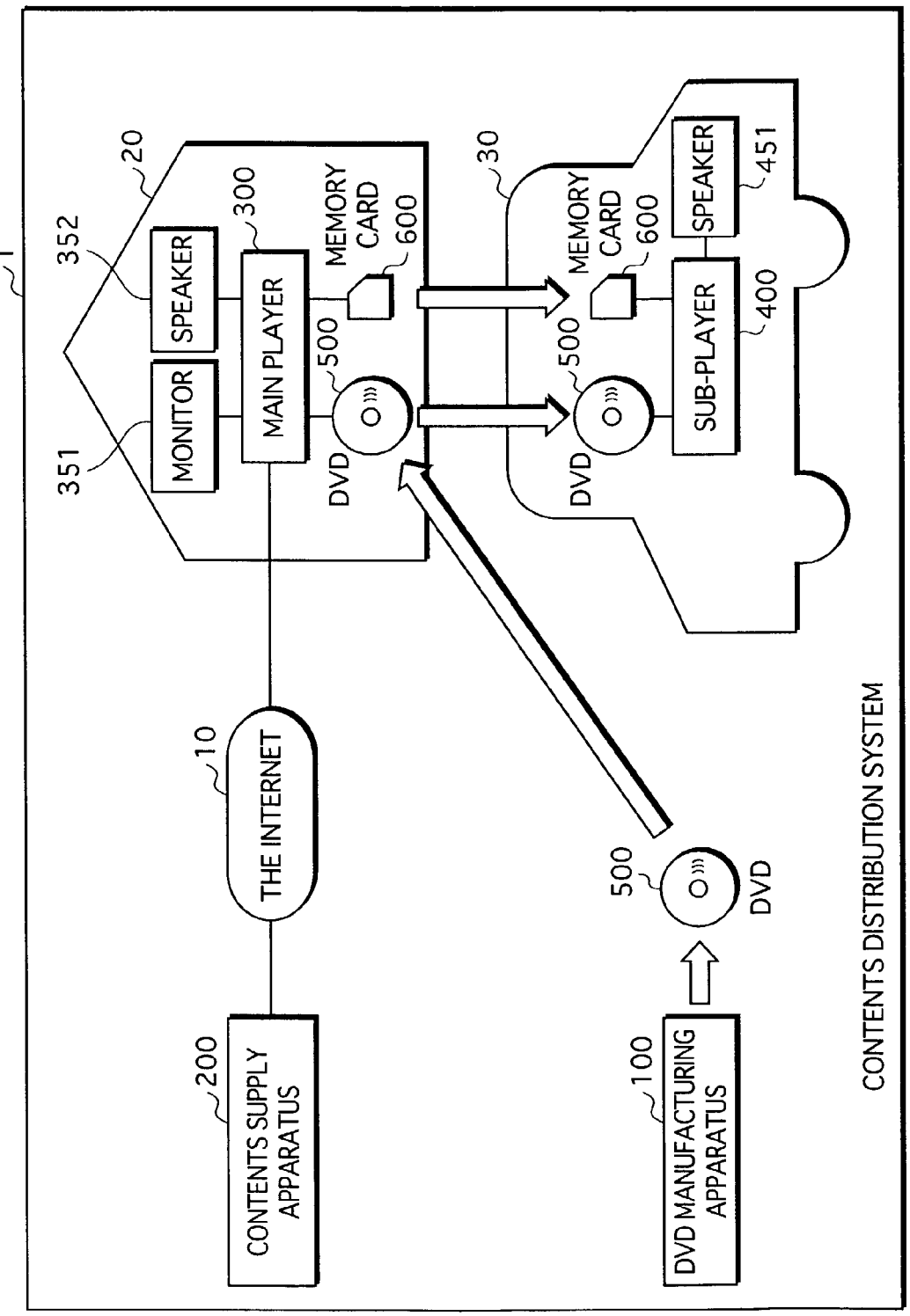
FIG. 1 is a block diagram showing the structure of a contents distribution system 1.

The contents distribution system 1, as shown in FIG. 1, is composed of a DVD manufacturing apparatus 100, a contents supply apparatus 200, a main player 300, and a sub-player 400.

The DVD manufacturing apparatus 100, which is owned by a DVD manufacturer, writes main content to a DVD. Here, DVD refers to a ROM-type recording medium to which information can be written only once. Furthermore, an example of main content is movie information composed of digital video data and digital audio data. A DVD 500 to which main content has been written is sold by a seller. A user purchases, and thus owns, the DVD 500.

The contents supply apparatus 200, which is owned by a sub-content supplier, distributes sub-content that relates to the main content via the Internet 10 to a user for a charge. Sub-content is content that relates to the main content. Examples of sub-content include video and audio information of a preview of a movie that is main content, subtitle information that expresses in characters the script spoken by the performers in the movie, and information regarding the performers in the movie.

The main player 300, which is owned by the user, is set in the house in which the user lives. A monitor 351 and a speaker 352 are connected to the main player 300. The user mounts the purchased DVD 500 in the main player 300. According to user operations, the main player 300 plays back the main content recorded on the DVD 500, and outputs video and audio to the monitor 351 and the speaker 352. Furthermore, the main player 300 is connected to the Internet 10, and according to the user operations, acquires sub-content that relates to the main content recorded on the DVD 500 from the contents supply apparatus 200, and writes the acquired sub-content to a memory card 600.

The sub-player 400, which is owned by the user, is provided in the user's car. The sub-player 400 includes a monitor (not illustrated), and a speaker 451. The user mounts the purchased DVD 500 in the sub-player 400. According to user operation, the sub-player 400 plays back the main content recorded on the DVD 500, and outputs video and audio to the internal monitor and the speaker 451. Furthermore, the user mounts both the purchased DVD 500 and the memory card 600 in the sub-player 400. The sub-player 400, according to user operation, reads the sub-content from the memory card 600, and plays back the read sub-content, only when both the DVD 500 and the memory card 600 are mounted in the sub-player 400.

1.2 Structure of the DVD Manufacturing Apparatus 100

Figure 2:
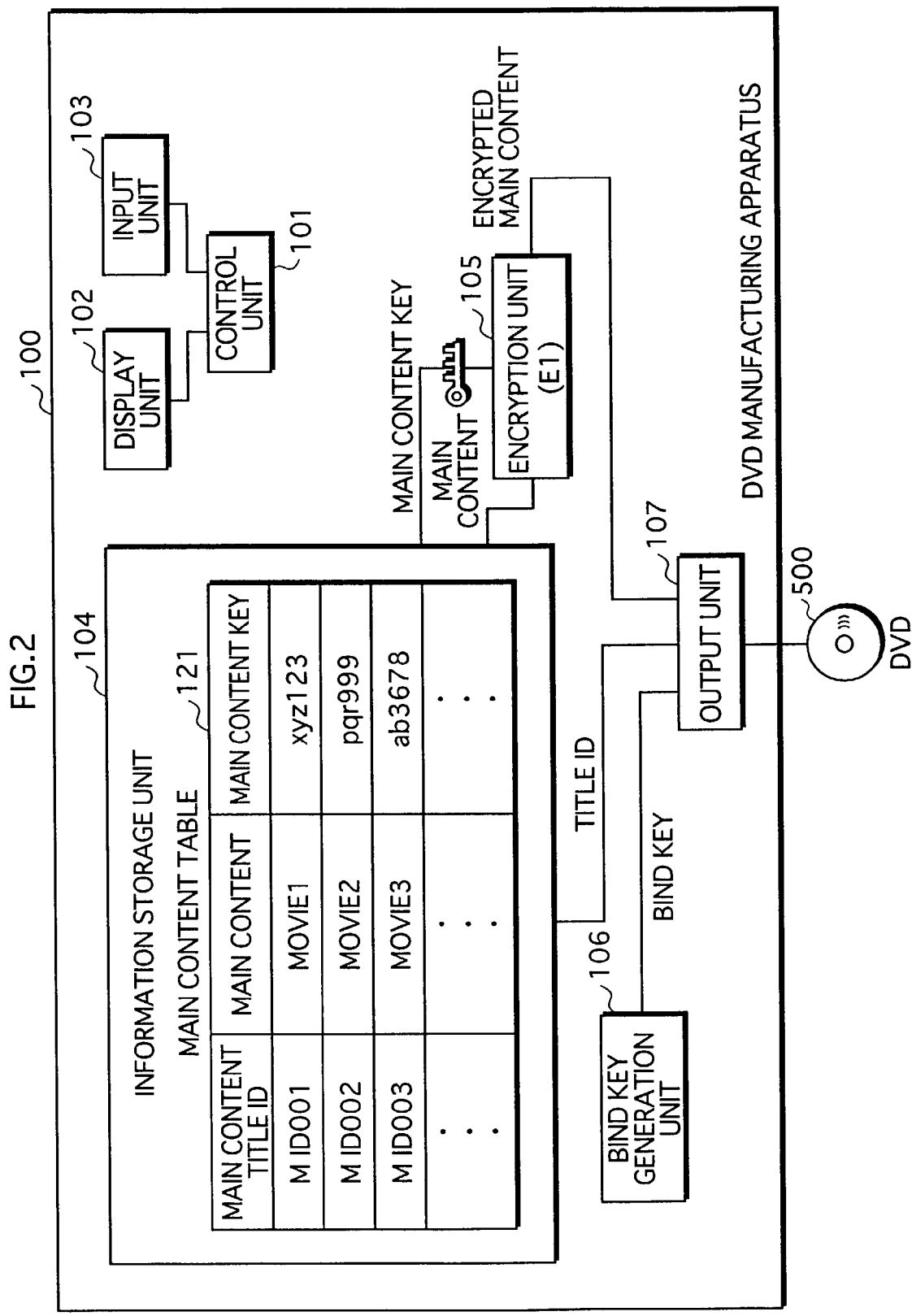
FIG. 2 is a block diagram showing the structure of a DVD manufacturing apparatus 100.

The DVD manufacturing apparatus 100, as shown in FIG. 2, is composed of a control unit 101, a display unit 102, an input unit 103, an information storage unit 104, an encryption unit 105, a bind key generation unit 106 and an output unit 107.

The DVD manufacturing apparatus 100 is specifically a computer system composed of a microprocessor, a ROM, a RAM, a hard disk unit, a display unit, a keyboard and so on. The RAM and the hard disk unit store computer programs. The DVD manufacturing apparatus 100 achieves its functions by the microprocessor operating according to the computer programs.

Note that each block in FIG. 2 is connected to other blocks by connection lines, but some of these connection lines are omitted in FIG. 2. Here, each connection line shows a path by which signals and information are conveyed. Furthermore, among the plurality of connection lines connected to the block that shows the encryption unit 105, those that have a key mark thereon show paths by which information is conveyed to the encryption unit 105 as a key. This also applies to other drawings.

(1) Information Storage Unit 104

The information storage unit 104 is specifically composed of a hard disk unit. The information storage unit 104, as shown in FIG. 2, has a main content table 121. The main content table 121 includes a plurality of pieces of main content information that are each composed of a main content title ID, main content, and a main content key.

Here, the main content is, as one example, movie information composed of digital video data and digital audio data.

The main content title ID is an identification number that uniquely identifies the main content. One example of the main content title ID is "MID001" as shown in FIG. 2. Here, the first character "M" of "MID001" is an identification code that shows that the content is main content. The character string "ID" that follows "M" is an identification code that shows that the title ID is a title identifier. Furthermore, the character string "001" that follows "ID" is a number for identifying the main content.

The main content key is information that is used as a key when encrypting the main content. The main content key is supplied by some means to a user who legitimately purchases a DVD on which is recorded encrypted main content that has been encrypted using the main content key. Note that since the supply of the main content key to the user is not the subject of the present invention, a description thereof is omitted.

(2) Control Unit 101, Display Unit 102 and Input Unit 103

The input unit 103 receives from an operator an operation to write the main content to a DVD, and the title ID of the main content. The input unit 103 outputs instruction information shown by the received operation, and the main content title ID to the control unit 101.

The control unit 101 receives the instruction information and the main content title ID, and controls the encryption unit 105, the bind unit 106 and the output unit 107 based on the received instruction information and main content title ID.

The display unit 102 displays various information according to control by the control unit 101.

(3) Encryption Unit 105

The encryption unit 105 has, as one example, an encryption algorithm E1 specified by DES (Data Encryption Standard).

The encryption unit 105, based on control by the control unit 101, reads from the main content table 121 the main content and the main content key that correspond to the main content title ID for which the input unit 103 received the input. The encryption unit 105 generates encrypted main content by applying the encryption algorithm E1 to the read main content using the read main content key as the key, and outputs the generated encrypted main content to the output unit 107.

(4) Bind Key Generation Unit 106

The bind key generation unit 106, based on control by the control unit 101, generates a random number for each DVD, and outputs the each generated random number to the output unit 107 as a bind key.

Note that it is possible to generate bind keys so that a plurality of DVDs have the same bind key, rather than generating a separate bind key for each DVD.

(5) Output Unit 107

The output unit 107 receives the main content title ID from the control unit 101. Furthermore, the output unit 107, based on control by the control unit 101, receives the encrypted main content from the encryption unit 105, and receives the bind key from the bind key generation unit 106.

Next, the output unit 107, based on control by the control unit 101, writes the received main content title ID, the bind key and the encrypted main content in correspondence to the DVD.

Figure 3:
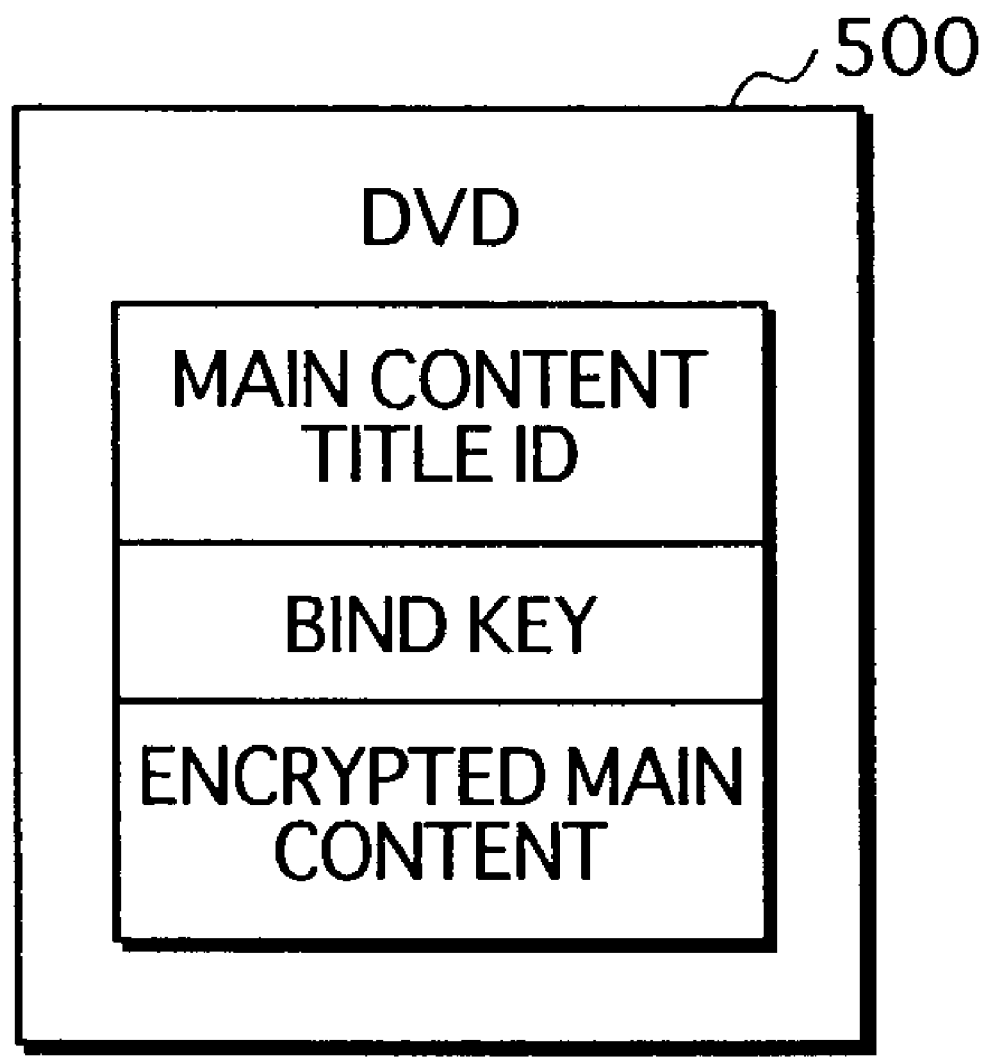
FIG. 3 shows one example of information recorded on a DVD 500.

In this way, the DVD 500 on which the main content title ID, the bind key and the encrypted main content are recorded, as shown in FIG. 3, is manufactured.

1.3 Structure of the Contents Supply Apparatus 200

Figure 4:
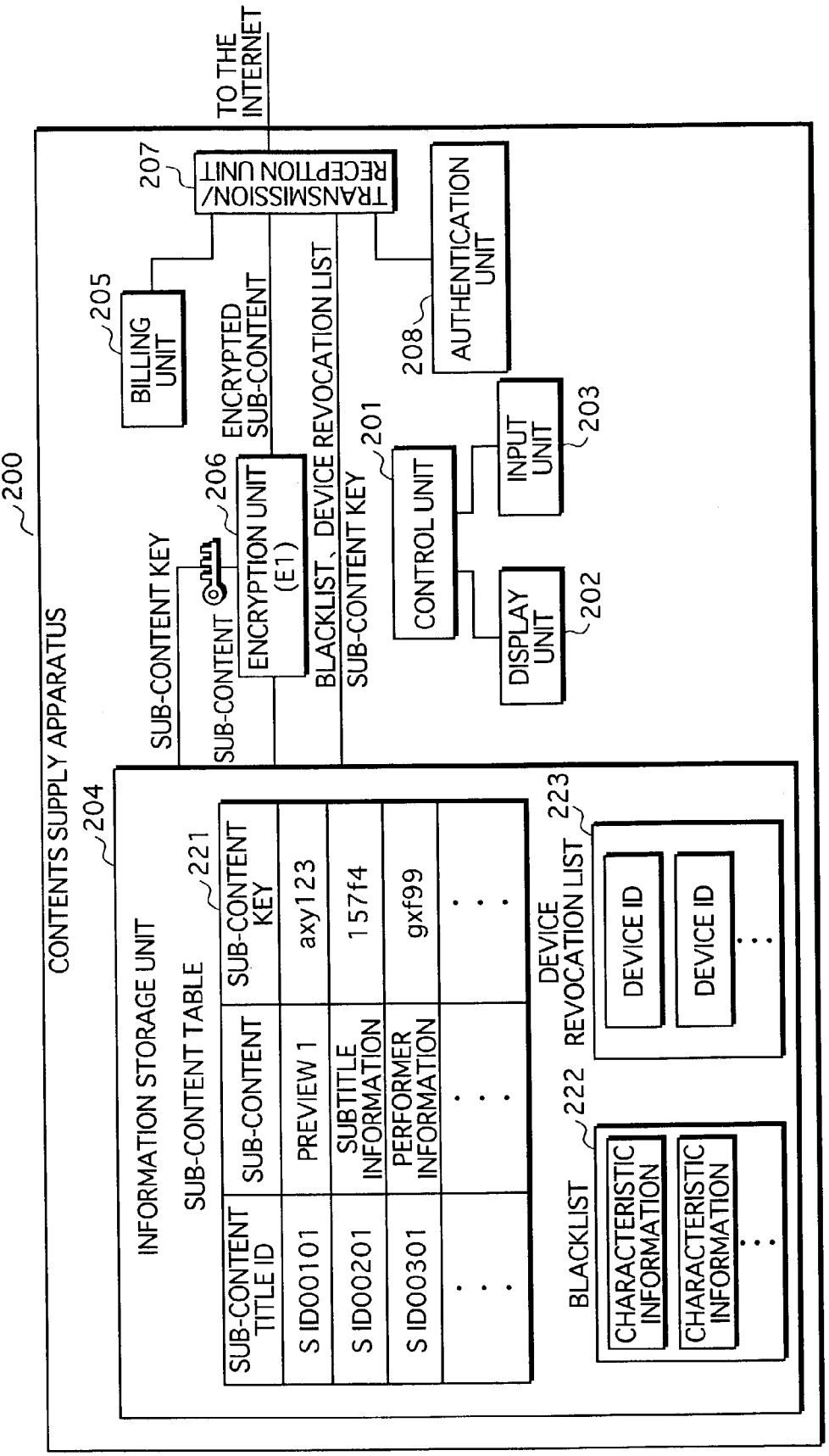
FIG. 4 is a block diagram showing the structure of a contents supply apparatus 200.

The contents supply apparatus 200, as shown in FIG. 4, is composed of a control unit 201, a display unit 202, an input unit 203, an information storage unit 204, a billing unit 205, an encryption unit 206, a transmission/reception unit 207 and an authentication unit 208.

The contents supply apparatus 200 is a computer similar to the DVD manufacturing apparatus 100. The contents supply apparatus 200 achieves its functions by a microprocessor operating according to computer programs.

(1) Information Storage Unit 204

The information storage unit 204 is specifically composed of a hard disk unit. The information storage unit 204, as shown in FIG. 4, has a sub-content table 221, a black list 222 and a device revocation list 223.

<Sub-Content Table 221>

The sub-content table 221, as shown in FIG. 4, includes a plurality of pieces of sub-content information that are each composed of a sub-content title ID, sub-content, and a sub-content key.

Here, the sub-content is information that relates to the main content, specifically a preview of a movie, subtitle information, information regarding performers in the movie, or the like, as described earlier. The sub-content title ID is an identification number that uniquely identifies the sub-content. One example of the sub-title ID is "SID00101" as shown in FIG. 4. Here, the first character "S" of "SID00101" is an identification code that shows that the content is sub-content. The character string "ID" that follows "S" is an identification code that shows that the title ID is a title identifier. Furthermore, the character string "001" that follows "ID" is a number for identifying the main content that relates to the sub-content. Furthermore, the character string "01" that follows "001" is a number for identifying the sub-content. In this way, information for designating the title ID of the related main content is included in the sub-content title ID. Therefore, if the sub-content title ID is known, the related main content title ID is also known. Conversely, if the main content title ID is known, the related sub-content title ID is known.

According to the above-described rules of naming for the title ID, a plurality of sub-contents can be associated with one main content.

Note that the rules for naming the title ID are not limited to those described above. It is possible to associate a plurality of sub-contents with a plurality of main contents.

The sub-content key is information used as a key when encrypting the sub-content.

<Black List 222>

The black list 222 includes information that identifies illegal recording media on which illegal content that is illegally copied main content is recorded, in other words, pirate disks. Specifically, the black list is composed of a plurality of pieces of characteristic information, as shown in FIG. 4.

The characteristic information is composed of sections of illegal data video data and illegal audio data recorded on a pirate disk that are characteristic of the illegal data and are extracted by analyzing the illegal data. The characteristic information is information that is not included in the legitimate digital video data or the digital audio data.

When characteristic information is extracted from digital data recorded on a recording medium, it is presumed that the recording medium is a pirate disk.

<Device Revocation List 223>

The device revocation list 223 is provided so that writing apparatuses that write information to recording media and playback apparatuses that playback information from recording media can be prevented from being used illegally after their secret key or encryption or decryption system has been illegally exposed to a third party.

The device revocation list 223, as shown in FIG. 4, includes a plurality of device IDs. Each device ID is a identification number for identifying a device whose secret key or encryption or decryption system has been illegally exposed to a third party.

(2) Control Unit 201

The control unit 201 receives a user ID, a sub-content acquisition request and a main content title ID from the main player 300 via the Internet 10 and the transmission/reception unit 207.

On receiving the user ID, the sub-content acquisition request and the main content title ID from the main player 300, the control unit 201 controls the authentication unit 208 so that the authentication unit 208 performs mutual device authentication with the main player 300.

Next, only when device authentication by the authentication unit 208 succeeds, the control unit 201 generates a sub-content search title ID, based on the received main content title ID. Specifically, when the main content title ID is "MID001", the control unit 201 extracts the section "001" from "MID001", and generates the sub-content search title ID by combining the identification code "S", the identification code "ID" and the extracted section "001". Next, the control unit 201 uses a forward match search method to extract the sub-content information that includes the sub-content title ID that matches the search title ID from the sub-content table 221. Furthermore, the control unit 201 extracts the sub-content title ID from the sub-content information acquired by extracting. Next, the control unit 201 outputs the user ID, a sub-content acquisition request and the sub-content title ID to the billing unit 205, and controls so that the billing unit 205 performs billing processing.

Next, the control unit 201 outputs the extracted sub-content title ID to the encryption unit 206, and controls so that the encryption unit 206 encrypts the sub-content.

Furthermore, the control unit 201 outputs the extracted sub-content title ID to the transmission/reception unit 207, and controls so that the transmission/reception unit 207 transmits the sub-content tile ID, the encrypted sub-content, the sub-content key, the black list and the device revocation list.

(3) Billing Unit 205

The billing unit 205 receives the user ID, the sub-content acquisition request, and the sub-content title ID from the control unit 201. On receiving the user ID, the sub-content acquisition request, and the sub-content title ID, the billing unit 205 bills the user shown by the received user ID for the sub-content shown by the received sub-content title ID.

(4) Authentication Unit 208

The authentication unit 208 performs mutual device authentication with an authentication unit 304 of the main player 300.

When the authentication unit 208 fails in device authentication, the contents supply apparatus 200 ends the sub-content supply process. When the authentication unit 208 succeeds in device authentication, the contents supply apparatus 200 continues the sub-content supply processing.

Details of authentication operations by the authentication unit 208 are described later.

(5) Encryption Unit 206

Based on control by the control unit 201, the encryption unit 206 reads the sub-content information that includes the sub-content title ID from the information storage unit 204, and extracts the sub-content and the sub-content key from the read sub-content information.

Next, based on control by the control unit 201, the encryption unit 206 generates encrypted sub-content by applying the encryption algorithm E1 to the sub-content using the sub-content key as the key, and outputs the generated encrypted sub-content and the sub-content key to the transmission/reception unit 207.

(6) Transmission/reception Unit 207

Based on control by the control unit 201, the transmission/reception unit 207 reads the blacklist 222 and the device revocation list 223 from the information storage unit 204.

Next, based on control by the control unit 201, the transmission/reception unit 207 transmits the sub-content title ID, the encrypted sub-content, the sub-content key, the blacklist and the device revocation list via the Internet 10 to the main player 300.

(7) Display Unit 202 and the Input Unit 203

The display unit 202 displays various information, based on control by the control unit 201.

The input unit 203 receives inputs from the user, and outputs the received input information to the control unit 201.

1.4 Structure of the Main Player 300

Figure 5:
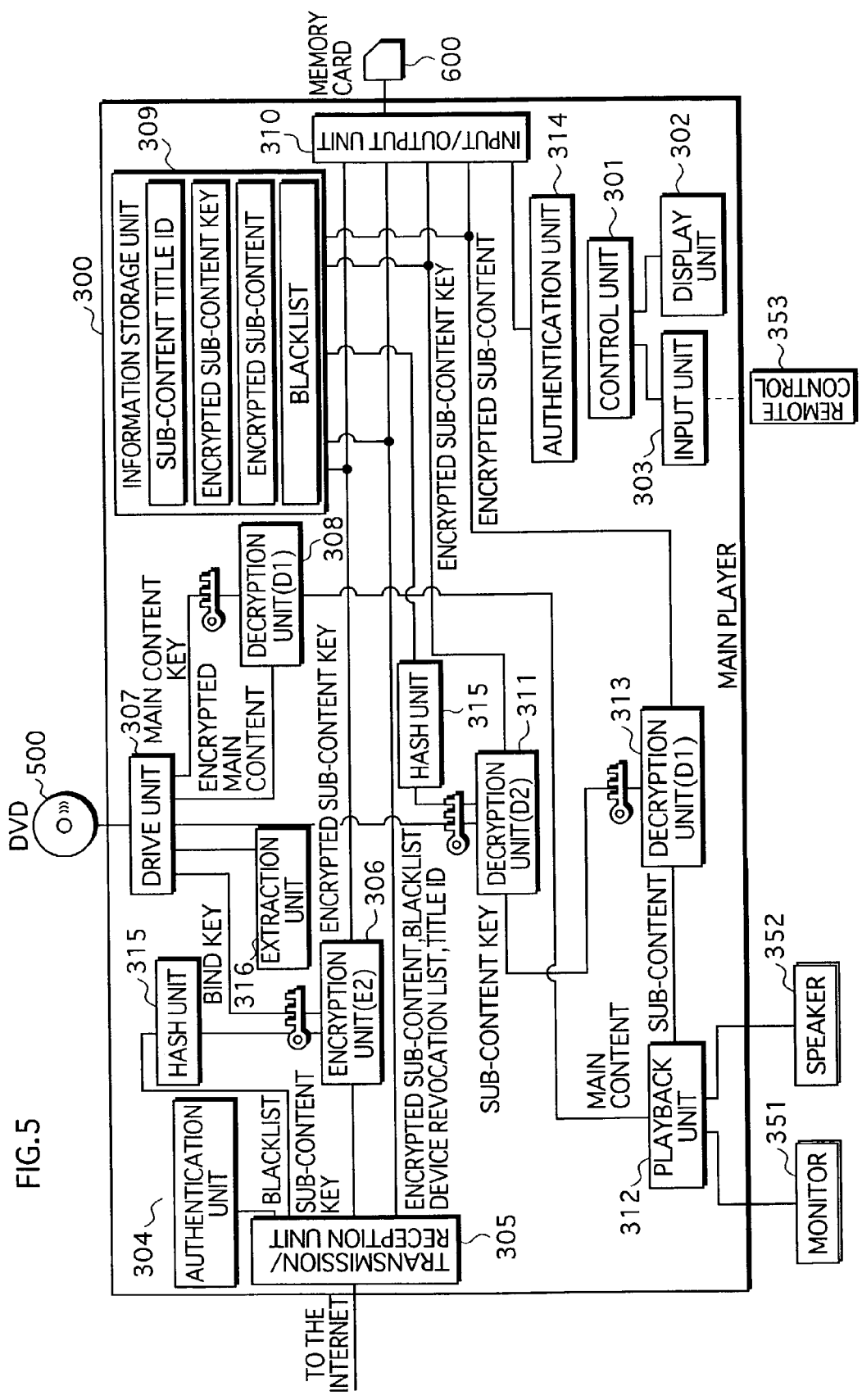
FIG. 5 is a block diagram showing the structure of a main player 300.

As shown in FIG. 5, the main player 300 is composed of a control unit 301, a display unit 302, an input unit 303, an authentication unit 304, a transmission/reception unit 305, an encryption unit 306, a drive unit 307, a decryption unit 308, an information storage unit 309, an input/output unit 310, a decryption unit 311, a playback unit 312, a decryption unit 313, an authentication unit 314, a hash unit 315 and an extraction unit 316. A monitor 351 and a speaker 352 are connected to the playback unit 312.

The main player 300 is a computer system similar to the DVD manufacturing apparatus 100. The main player 300 achieves its functions by a microprocessor operating according to computer programs.

(1) Information Storage Unit 309

The information storage unit 309 is specifically composed of a hard disk unit, and, as shown in FIG. 5, includes areas for storing a sub-content title ID, an encrypted sub-content key, encrypted content and a blacklist.

The sub-content title ID is identification information for uniquely identifying sub-content.

The encrypted sub-content key is a sub-content key that has been encrypted.

The encrypted sub-content is sub-content that has been encrypted.

Here, the title ID, the encrypted sub-content key and the encrypted sub-content are in correspondence.

As described earlier, the blacklist includes information that identifies illegal recording media on which illegal content that is illegally copied main content is recorded, in other words, pirate disks. Specifically, the black list is composed of a plurality of pieces of characteristic information.

(2) Input Unit 303

When sub-content is to be acquired, the input unit 303 receives a sub-content acquisition request from the user, and outputs the received acquisition request to the control unit 301.

When sub-content is to be played back, the input unit 303 receives input of the title ID of the sub-content to be played back, from the user via a remote control 353, and outputs the title ID of which input was received to the control unit 301.

(3) Control Unit 301

When sub-content is to be acquired, the control unit 301 receives the acquisition request from input unit 303, controls the drive unit 307 so that the main content title ID is read from the DVD 500, and receives the main content title ID from the drive unit 307. Next, the control unit 301 transmits an internally-stored user ID, the sub-content acquisition request and the main content title ID via the transmission/ reception unit 305 and the Internet 10 to the contents supply apparatus 200. Here, the user ID is identification information for uniquely identifying the user.

In addition, the control unit 301 receives authentication result information showing either authentication success or failure, from the authentication unit 314, and controls the various compositional elements based on the received authentication result information.

In addition, when sub-content is to be played back, the control unit 301 outputs the received sub-content title ID to the drive unit 307.

(4) Transmission/reception Unit 305

The transmission/reception unit 305 receives the sub-content title ID, the encrypted sub-content, the sub-content key, the blacklist, and the device revocation list from the contents supply apparatus 200 via the Internet 10, and, based on control by the control unit 301, outputs the received sub-content key to the encryption unit 306, outputs the received encrypted sub-content to the input/output unit 310, outputs the received blacklist and device revocation list to the input/output unit 310, and outputs the received blacklist to the hash unit 315.

Furthermore, the transmission/reception unit 305 writes the received content title ID and the received encrypted sub-content to the information storage unit 309.

(5) Authentication Unit 304

The authentication unit 304 performs mutual device authentication with the authentication unit 208 of the contents supply apparatus 200.

When the authentication unit 304 fails in device authentication, the main player 300 ends the sub-content acquisition process. When the authentication unit 304 succeeds in device authentication, the main player 300 continues the sub-content acquisition processing.

Details of authentication operations by the authentication unit 304 are described later.

(6) Drive Unit 307

According to control by the control unit 301, the drive unit 307 reads the main content title ID from the DVD 500, and outputs the read main content title ID to the control unit 301.

The drive unit 307 reads the bind key that corresponds to the main content title ID from the DVD 500, and outputs the read bind key to the encryption unit 306.

When sub-content is to be played back, the drive unit 307 receives the main content title ID from the control unit 301, reads from the DVD 500 the bind key that corresponds to the received main content title ID, and outputs the read bind key to the decryption unit 311.

(7) Hash Unit 315

The hash unit 315 receives the blacklist from the transmission/reception unit 305, calculates a hash value H by applying a function Hash to the blacklist, and outputs the calculated hash value H to the encryption unit 306.

The hash unit 315 reads the blacklist that corresponds to the sub-content title ID from the information storage unit 309.

When the extraction unit 316 judges that generated characteristic information is not included on the read blacklist, the hash unit 315 reads the blacklist from the information storage unit 309, generates a hash value H=Hash (blacklist) by applying the hash function Hash to the read blacklist, and outputs the generated hash value H to the decryption unit 311.

(8) Encryption Unit 306

The encryption unit 306 receives the bind key from the drive unit 307, receives the hash value H from the hash unit 315, and receives the sub-content key from the transmission/reception unit 305. Next, the encryption unit 306 generates a key by connecting the received hash value H and the received bind key in the stated order, and generates an encrypted sub-content key by applying the encryption algorithm E2 to the received sub-content key with use of the generated key. Here, the encryption algorithm E2 is a DES encryption algorithm.

Next, the encryption unit 306 outputs the generated encrypted sub-content key to the input/output unit 310. In addition, the encryption unit 306 writes the generated encrypted sub-content key to the information storage unit 309.

(9) Authentication Unit 314

When information is to be written to the memory card 600, the authentication unit 314 performs mutual device authentication with an authentication unit 602 of the memory card 600.

When the authentication unit 314 fails in device authentication with the authentication unit 602 of the memory card 600, the main player 300 ends processing for accessing the memory card 600.

Only when the authentication unit 314 succeeds in authentication with the authentication unit 602 of the memory card 600, the main player continues further processing for accessing the memory card 600.

The authentication unit 314 outputs authentication result information showing authentication success or failure to the control unit 301.

(10) Input/output Unit 310

Only when device authentication by the authentication unit 314 is successful, the input/output unit 310 receives the sub-content title ID from the control unit 301, receives the encrypted sub-content, the blacklist and the device revocation list from the transmission/reception unit 305, receives the encrypted sub-content from the encryption unit 306, and outputs the received sub-content title ID, the encrypted sub-content key, the encrypted sub-content, the blacklist and the device revocation list to the memory card 600.

(11) Decryption Unit 311

The decryption unit 311 reads the encrypted sub-content key that corresponds to the sub-content title ID from the information storage unit 309.

Furthermore, the decryption unit 311 receives the bind key from the drive unit 307, receives the hash value H from the hash unit 315, and generates a key by connecting the received hash value H and the received bind key in the stated order. Next, the decryption unit 311 generates a sub-content key by applying a decryption algorithm D2 to the read encrypted sub-content key using the generated key, and outputs the generated sub-content key to the decryption unit 313.

Here, the decryption algorithm D2 corresponds to the encryption algorithm E2, and is an algorithm for decrypting a ciphertext encrypted by the encryption algorithm E2.

(12) Decryption Unit 313

The decryption unit 313 reads the encrypted sub-content that corresponds to the sub-content title ID from the information storage unit 309.

Next, the decryption unit 313 receives the sub-content key from the decryption unit 311, generates sub-content by applying a decryption algorithm D1 to the read encrypted sub-content using the received sub-content key, and outputs the generated sub-content to the playback unit 312.

Here, the decryption algorithm D1 corresponds to the encryption algorithm E1, and is an algorithm for decrypting a ciphertext encrypted by the encryption algorithm E1.

(13) Extraction Unit 316

The extraction unit 316 reads the main content from the DVD 500 via the drive unit 307, and extracts a characteristic from the read main content to generate characteristic information. Then, the extraction unit 316 reads the blacklist from the information storage unit 309, and judges whether generated characteristic information is included on the read black list. When the characteristic information is judged to be included, the DVD 500 is considered to be a pirate disk, and the extraction unit 316 outputs an instruction to the control unit 301 to stop subsequent processing. When the characteristic information is judged not to be included, the extraction unit 316 outputs an instruction to the control unit 301 to continue processing.

(14) Playback Unit 312

The playback unit 312 receives sub-content, generates a video signal from the received sub-content and outputs the generated video signal to the monitor 351, and also generates an audio signal from the received sub-content and outputs the generated audio signal to the speaker 352.

1.5 Structure of the Memory Card 600

Figure 6:
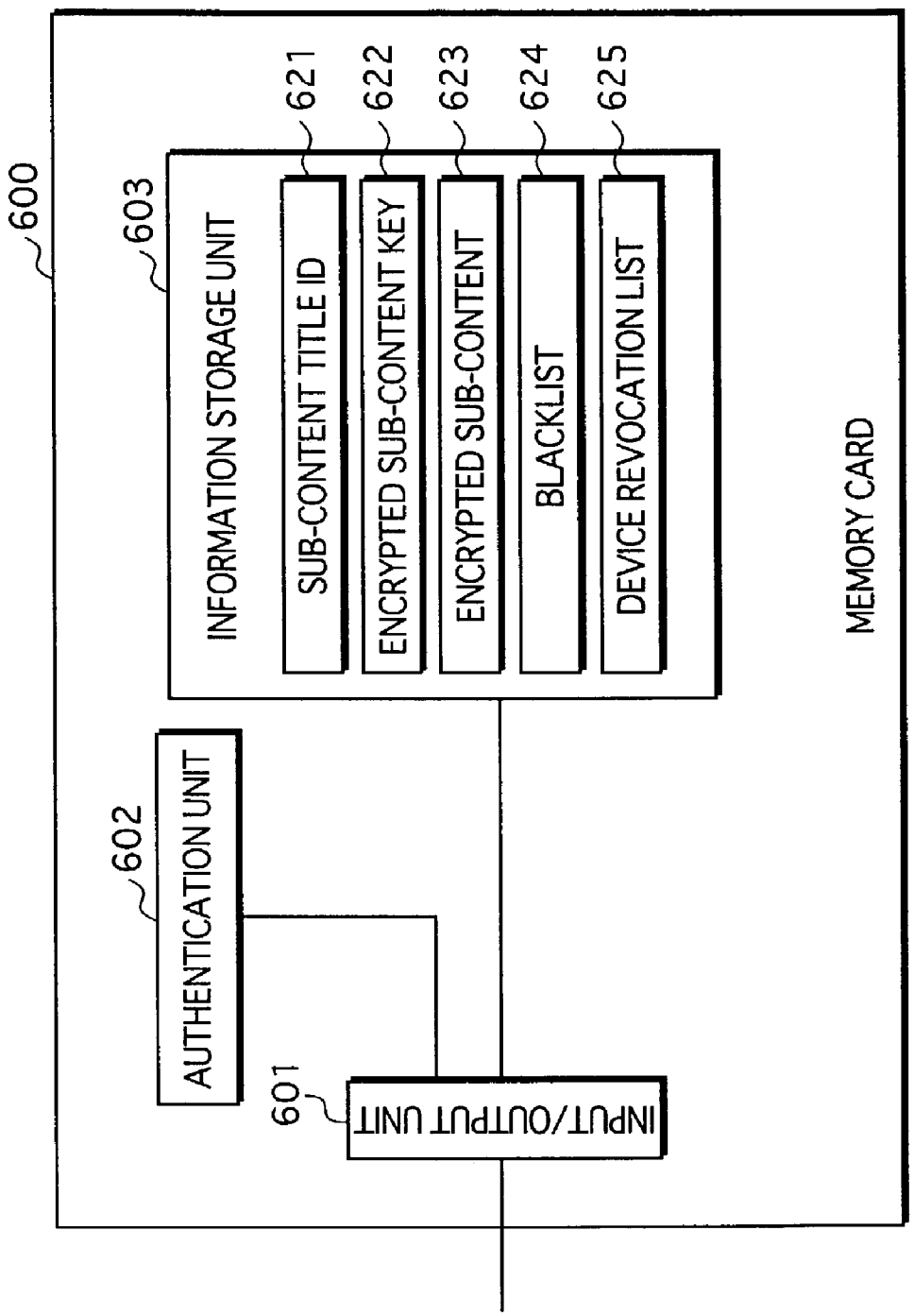
FIG. 6 is a block diagram showing the structure of a memory card 600.

As shown in FIG. 6, the memory card 600 is composed of an input/output unit 601, the authentication unit 602, and an information storage unit 603.

The memory card 600 is a computer system similar to the DVD manufacturing apparatus 100. The memory card 600 achieves its functions by a microprocessor operating according to computer programs.

The memory card 600 mounted in the main player 300 or the sub-player 400.

The memory card 600 receives information from whichever of the main player 300 and the sub-player 400 it is mounted in, and writes the received information to the information storage unit 603.

Furthermore, following instructions from the main player 300 or the sub-player 400, the memory card 600 reads information from the information storage unit 603, and outputs the read information to the main player 300 or the sub-player 400.

(1) Information Storage Unit 603

As shown in FIG. 6, the information storage unit 603 has areas for storing a sub-content title ID 621, an encrypted sub-content key 622, encrypted sub-content 623, a blacklist 624 and a device revocation list 625.

These are the same as was described earlier, and therefore descriptions are omitted.

(2) Input/output Unit 601

The input/output unit 601 performs input and output of information between the information storage unit 603 and the main player 300, or between the information storage unit 603 and the sub-player 400.

(3) Authentication Unit 602

When the memory card 600 is mounted in the main player 300, the authentication unit 602 performs mutual device authentication with the authentication unit 314 of the main player 300. The authentication unit 602 continues subsequent processing only when authentication succeeds. When authentication fails, the authentication unit 602 ends processing.

When the memory card 600 is mounted in the sub-player 400, the authentication unit 602 performs mutual device authentication with the authentication unit 414 of the sub-player 400. The authentication unit 602 continues subsequent processing only when authentication succeeds. When authentication fails, the authentication unit 602 ends processing.

1.6 Structure of the Sub-player 400

Figure 7:
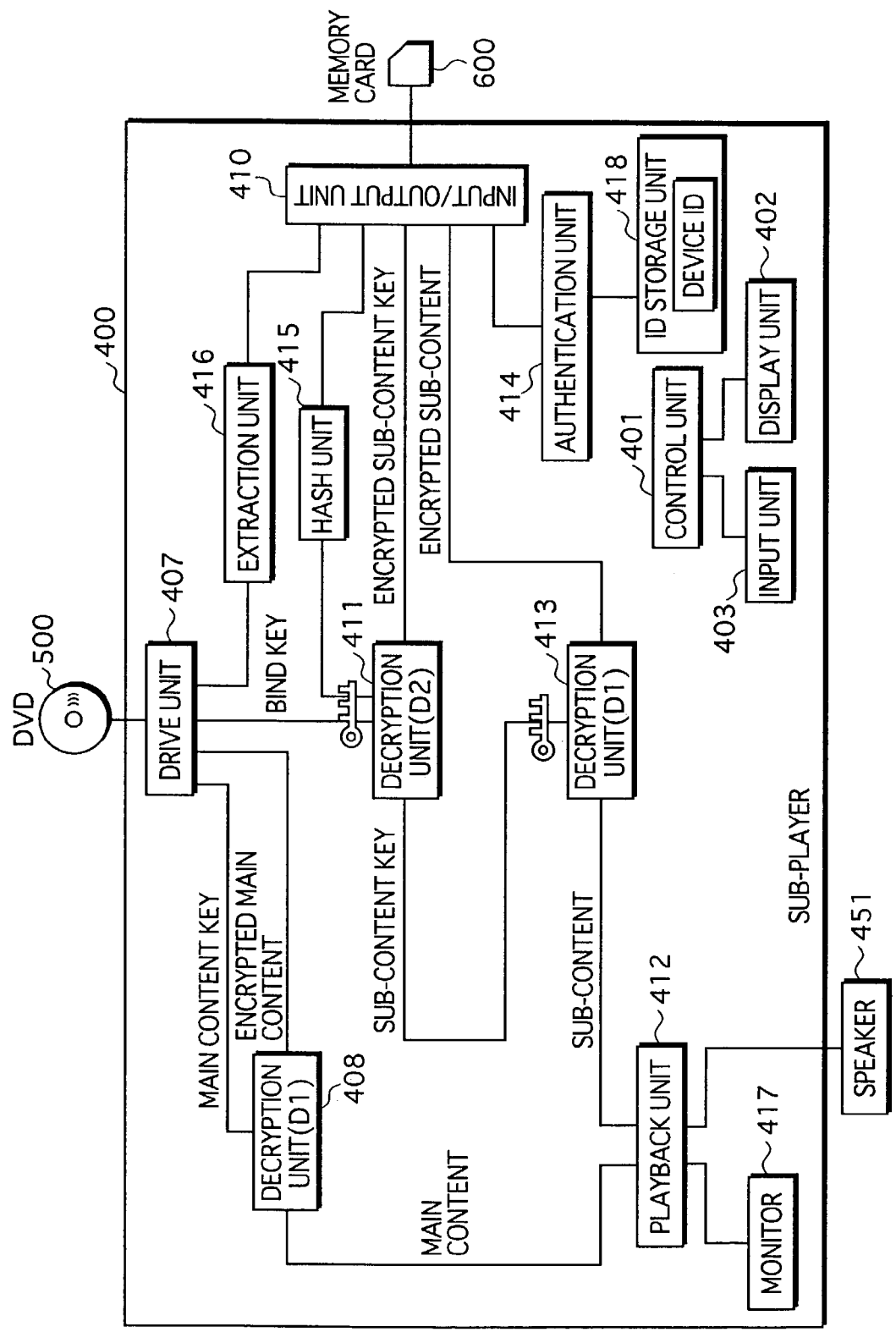
FIG. 7 is a block diagram showing the structure of a sub-player 400.

As shown in FIG. 7, the sub-player 400 is composed of a control unit 401, a display unit 402, an input unit 403, a drive unit 407, a decryption unit 408, an input/output unit 410, a decryption unit 411, a playback unit 412, a decryption unit 413, the authentication unit 414, a hash unit 415, an extraction unit 416, a monitor unit 417 and an ID storage unit 418.

The sub-player 400 is a computer system similar to the DVD manufacturing apparatus 100. The sub-player 400 achieves its functions by a microprocessor operating according to computer programs.

(1) Input Unit 403

The input unit 403 receives designation of sub-content to be played back from the user, and acquires the title ID of the designated sub-content from the memory card 600 via the input/output unit 410. Next, the input unit 403 outputs the acquired sub-content title ID to the control unit 401.

(2) Control Unit 401

The control unit 401 receives the sub-content title ID, and generates a main content title ID based on the received sub-content title ID. Here, the method used for generating the main content title ID is based on the rules for naming a title ID described earlier. Next, the control unit 401 outputs the generated main content title ID to the drive unit 407.

(3) Drive Unit 407

The drive unit 407 receives the main content title ID from the control unit 401, reads the bind key that corresponds to the received main content title ID from the DVD 500, and outputs the read bind key to the decryption unit 411.

(4) Authentication Unit 414

The authentication unit 414 performs mutual device authentication with the authentication unit 602 of the memory card 600. When device authentication succeeds, the authentication unit continues subsequent processing. When device authentication fails, the various apparatuses stop subsequent processing.

(5) Input/output Unit 410

When mutual device authentication succeeds, the input/output unit 410 outputs a request to the memory card 600 to read the blacklist, the encrypted sub-content key and the encrypted sub-content.

Next, the input/output unit 410 receives the blacklist, the encrypted sub-content key and the encrypted sub-content key from the memory card 600.

(6) Extraction Unit 416

The extraction unit 416 reads the main content from the DVD 500 via the drive unit 407, and generates characteristic information by extracting a characteristic from the read main content. Next, the extraction unit 416 receives the blacklist from the input/output unit 410, and judges whether the generated characteristic information is included in the blacklist.

When the characteristic information is judged to be included, the DVD 500 is considered to be a pirate disk, and the extraction unit 416 outputs an instruction to the control unit 401 to stop subsequent processing. At this point, the control unit 401 controls the various compositional elements so as to stop subsequent processing. In this way, the sub-player 400 stops playback of the sub-content.

When the characteristic information is judged to not be included on the blacklist, processing continues.

(7) Hash Unit 415

When the extraction unit 416 judges that the generated characteristic information is not included on the blacklist, the hash unit 415 receives the blacklist form the input/output unit 410, generates a hash value H=Hash (blacklist) by applying a function Hash to the blacklist, and outputs the generated hash value H to the decryption unit 411.

(8) Decryption Unit 411

The decryption unit 411 receives the bind key from the drive unit 407, receives the hash value H from the hash unit 415, generates a key by connecting the received hash value H and the received bind key in the stated order, generates a sub-content key by applying the decryption algorithm D2 to the read encrypted sub-content key with use of the generated key, and outputs the generated sub-content key to the decryption unit 413.

(9) Decryption Unit 413

The decryption unit 413 receives encrypted sub-content from the input/output block 410. In addition, the decryption unit 413 receives the sub-content key from the decryption unit 411, generates sub-content by applying the decryption algorithm D1 to the received encrypted content using the received sub-content key, and outputs the generated sub-content to the playback unit 412.

(10) Playback Unit 412

The playback unit 412 receives the sub-content from the decryption unit 413, generates a video signal from the received sub-content and outputs the generated video signal to the monitor 417, and also generates an audio signal from the received sub-content and outputs the generated audio signal to the speaker 451.

1.6 Operations by the DVD Manufacturing Apparatus 100

Figure 8:
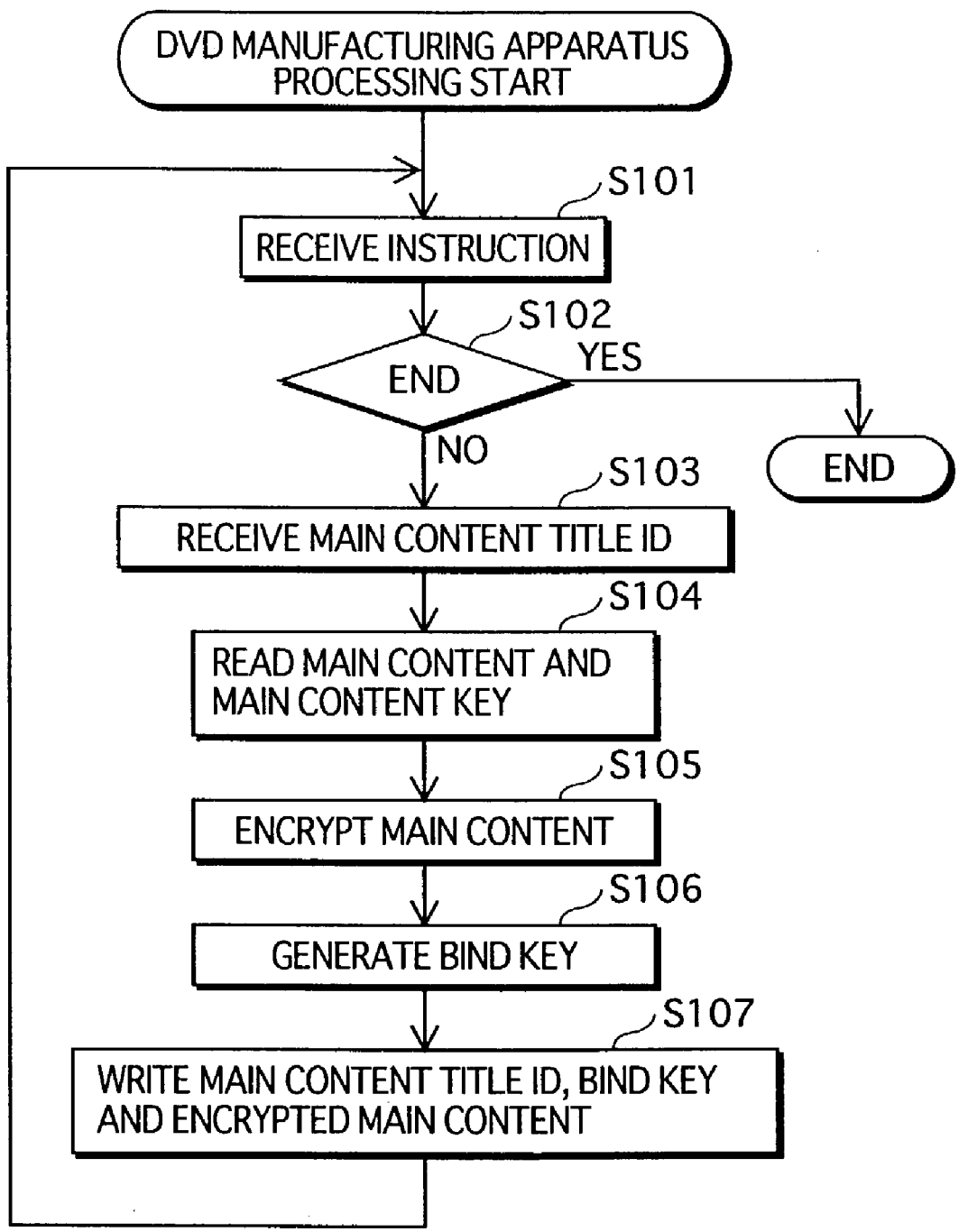
FIG. 8 is a flowchart showing operations by the DVD manufacturing apparatus 100.

The following describes operations by the DVD manufacturing apparatus 100 with use of the flowchart in FIG. 8.

The input unit 103 receives an operation for writing to a DVD or an operation for ending writing to a DVD from an operator, and outputs instruction information showing the received operation to the control unit 101 (step S101).

When the control unit 101 receives instruction information showing ending writing to a DVD (step S102), the control unit 101 ends processing by the DVD manufacturing apparatus 100.

When the control unit 101 receives instruction information showing writing to a DVD (step S102), the input unit 103 additionally receives the main content title ID from the user and outputs the received main content title ID to the control unit 101, and the control unit 101 receives the title ID (step S103).

Next, based on control by the control unit 101, the encryption unit 105 reads from the main content table 121 the main content and main content key that are in correspondence with the title ID of which input was received (step S104). The encryption unit 105 generates encrypted main content by applying the encryption algorithm E1 to the read main content using the read content key as the key, and outputs the generated encrypted main content to the output unit 107. (step S105).

Next, based on control by the control unit 101, the bind key generation unit 106 generates a random number that is unique to the DVD, and outputs the generated random number to the output unit 107 as the bind key (step S106).

Next, the output unit 107 receives the title ID from the control unit 101, receives the encrypted main content from the encryption unit 105, receives the bind key from the bind key generation unit 106, and then writes the received main content title ID, bind key and encrypted main content to the DVD (step S107). Next, the DVD manufacturing apparatus 100 returns to step S101 and repeats the processing.

1.7 Operations by the Main Player 300 for Acquiring Sub-content

Figure 9:
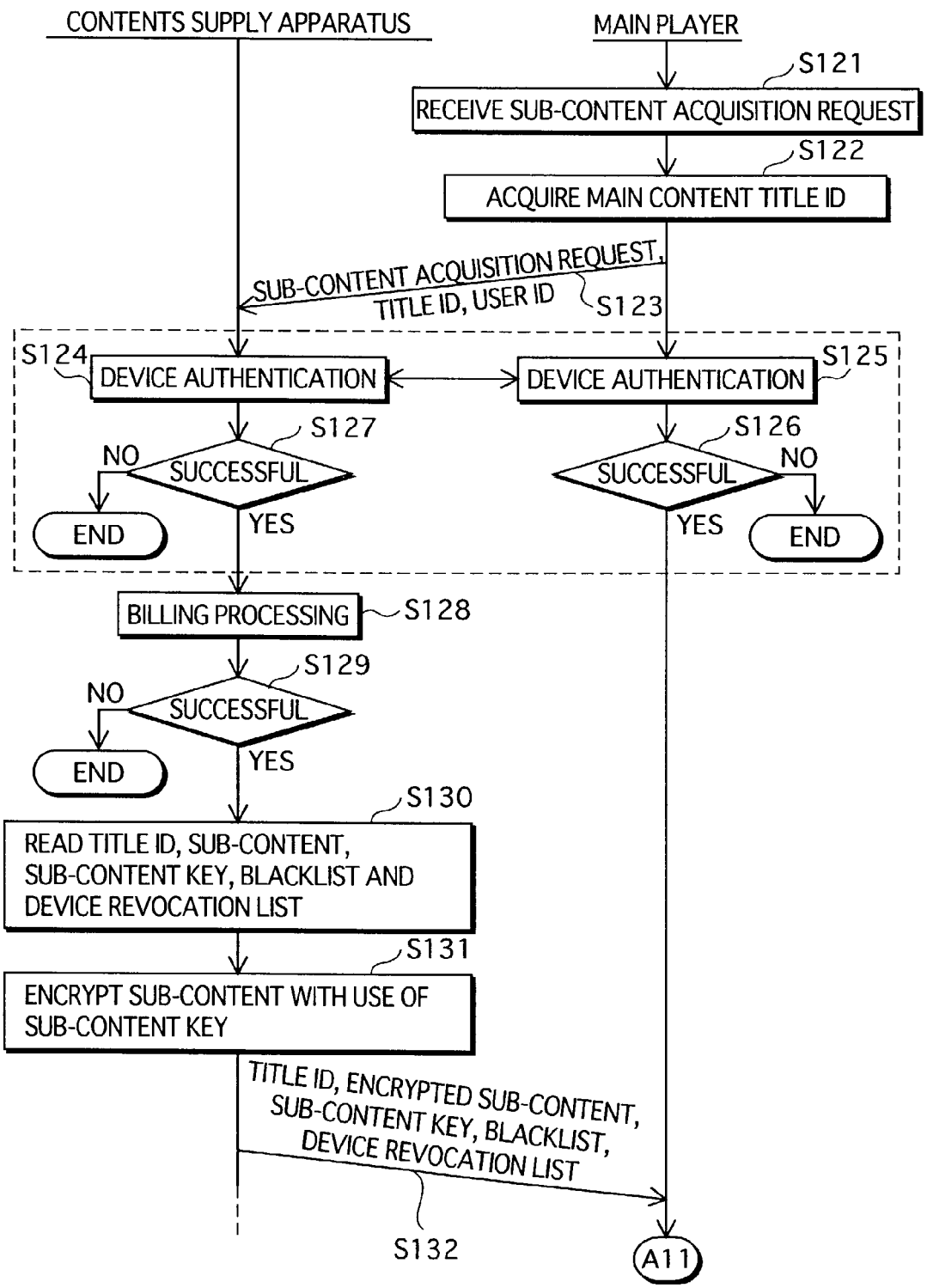
FIG. 9 is a flowchart showing operations by the main player 300 for acquiring sub-content, and continues in FIG. 10.
Figure 10:
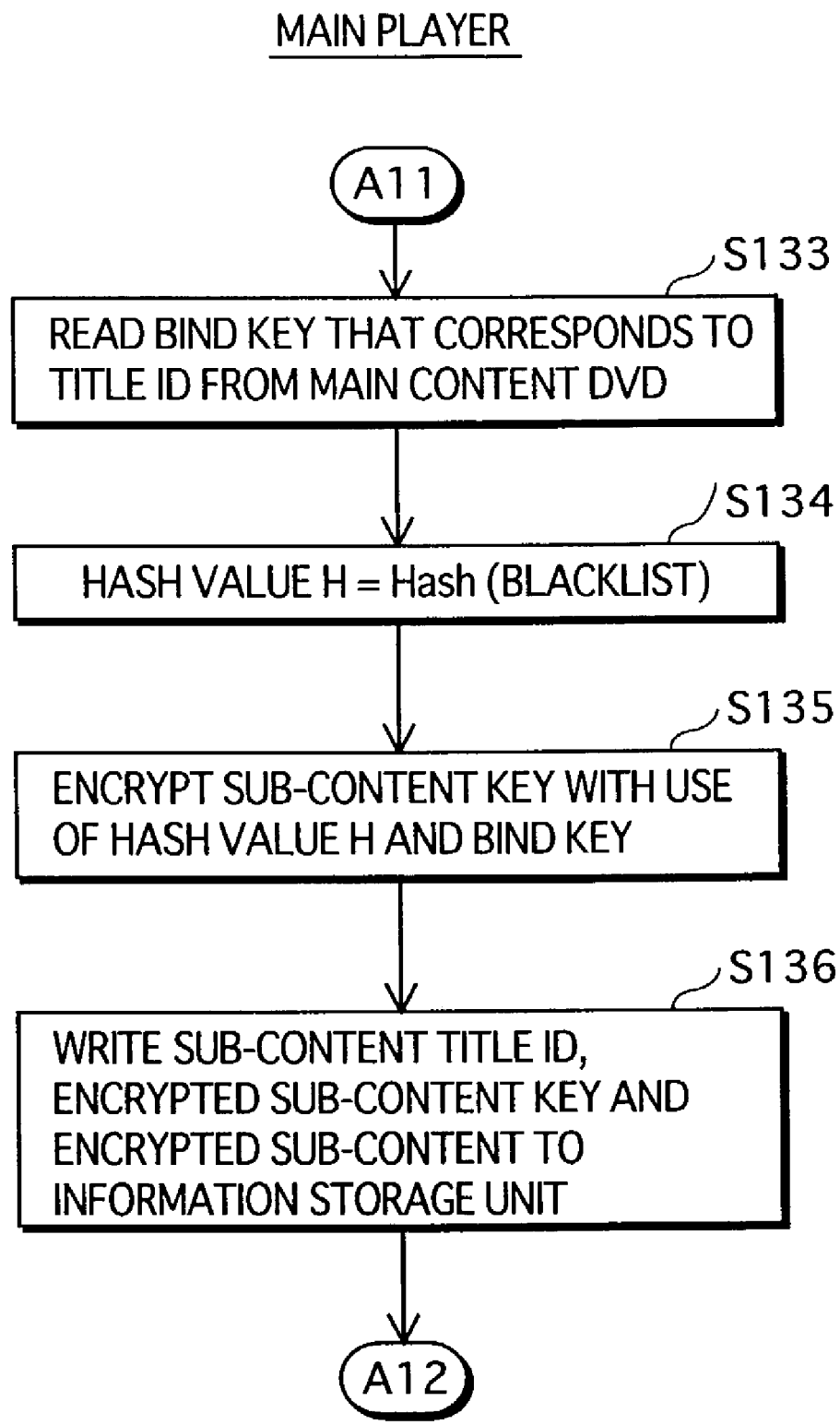
FIG. 10 is a flowchart showing operations by the main player 300 for acquiring sub-content, and continues in FIG. 11.
Figure 11:
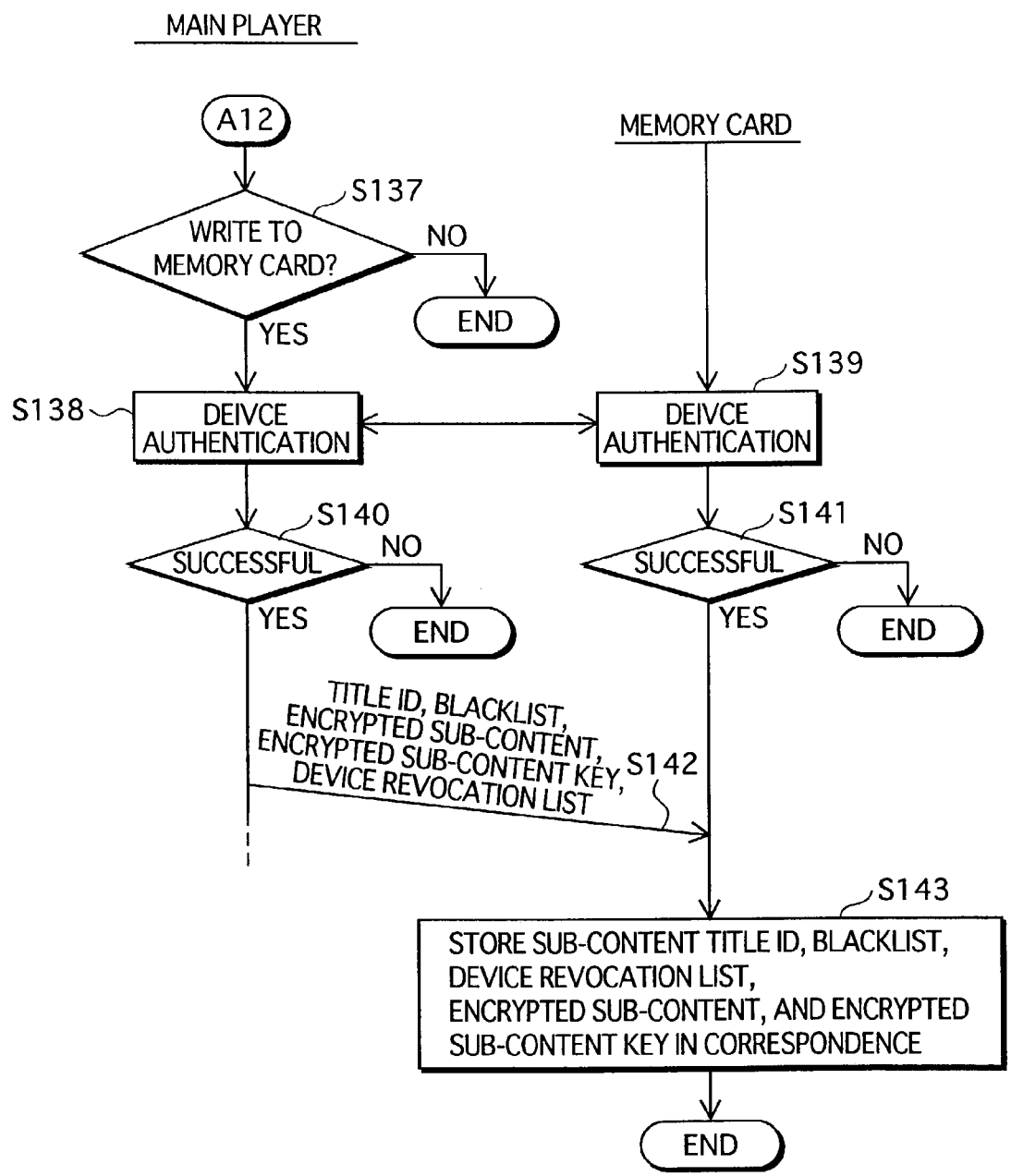
FIG. 11 is a flowchart showing operations by the main player 300 for acquiring sub-content, and continues from FIG. 10.

The following describes operations by the main player 300 for acquiring sub-content, with use of the flowcharts in FIGS. 9 to 11.

The input unit 303 of the main player 300 receives an acquisition request for sub-content from the user, and outputs the received acquisition request to the control unit 301. The control unit 301 receives the acquisition request from the input unit 303 (step S121). In addition, the control unit 301 controls the drive unit 307 so that the drive unit 307 reads the title ID, and the control unit 301 receives the title ID from the drive unit 307 (step S122).

Next, the control unit 301 transmits the internally-stored user ID, the sub-content acquisition request and the main content title ID to the contents supply apparatus 200 via the transmission/reception unit 305 and the Internet 10 (step S123).

Next, the control unit 201 of the contents supply apparatus 200 receives the user ID, the sub-content acquisition request and the main content title ID from the main player 300 via the Internet 10 and the transmission/reception unit 207 (step S123).

Next, the authentication unit 304 of the main player 300 and the authentication unit 208 of the contents supply apparatus 200 perform mutual device authentication (steps S124, S125).

When either of the authentication unit 304 and the authentication unit 208 fails in device authentication, or when both fail in device authentication (steps S126, S127), the apparatuses end processing.

Only when both the authentication unit 304 and the authentication unit 208 succeed in device authentication (steps S126, S127), the processing proceeds to the next step.

Next, based on control by the control unit 201, the encryption unit 206 of the contents supply apparatus 200 reads the sub-content information that includes the sub-content title ID from the information storage unit 204, and extracts the sub-content and the sub-content key from the read sub-content information. Based on control by the control unit 201, the transmission/reception unit 207 reads the blacklist 222 and the device revocation list 223 from the information storage unit 204 (step S130).

Next, based on control by the control unit 201, the encryption unit 206 generates encrypted sub-content by applying the encryption algorithm E1 to the sub-content using the sub-content key as the key, and outputs the generated sub-content and the sub-content key to the transmission/reception unit 207 (step S131).

Next, based on control by the control unit 201, the transmission/reception unit 207 transmits the encrypted sub-content, the sub-content key, the blacklist and the device revocation list to the main player 300 via the Internet 10 (step S132).

The transmission/reception unit 305 of the main player 300 receives the encrypted sub-content, the sub-content key, the blacklist and the device revocation list from the contents supply apparatus 200 via the Internet 10, and, based on control by the control unit 301, outputs the received sub-content key to the encryption unit 306, outputs the encrypted sub-content to the input/output unit 310, outputs the blacklist and the device revocation list to the input/output unit 310, and outputs the blacklist to the hash unit 315 (step S132).

The drive unit 307 receives the bind key that corresponds to the main content title ID from the DVD 500, and outputs the read bind key to the encryption unit 306 (step S133)

Next, the hash unit 315 receives the blacklist from the transmission/reception unit 305, calculates a hash value H by applying the hash function Hash to the received blacklist, and outputs the calculated hash value H to the encryption unit 306 (step S134).

Next, the encryption unit 306 receives the bind key from the drive unit 307, receives the hash value H from the hash value H, and receives the sub-content key from the transmission/reception unit 305. The encryption unit 306 generates a key by combining the received hash value H and the received bind key in the stated order, and generates an encrypted sub-content key by applying the encryption algorithm E2 to the received sub-content using the generated key (step S135)

Next, the control unit 301 writes the sub-content title ID to the information storage unit 309, the encryption unit 306 writes the encrypted sub-content to the information storage unit 309, and the transmission/reception unit 305 writes the encrypted sub-content to the information storage unit 309 (step S136).

Next, when there is no information to write to the memory card 600 (step S137), the main player 300 ends the sub-content acquisition processing.

On the other hand, when there is information to write to the memory card 600 (step S137), the authentication unit 314 of the main player 300 and the authentication unit 602 of the memory card 600 perform mutual device authentication (step s138, S139).

When the authentication unit 314 or the authentication unit 602 fails in device authentication, or when both fail in device authentication (step S140, S141), the apparatuses end processing.

Only when both the authentication unit 314 and the authentication unit 602 succeed in device authentication (steps S140, S141), the processing proceeds to the next step.

The input/output unit 310 receives the sub-content title ID from the control unit 301, receives the encrypted sub-content, the blacklist and the device revocation list from the transmission/reception unit 305, receives the encrypted sub-content key from the encryption unit 306, and outputs the received sub-content title ID, encrypted sub-content key, encrypted sub-content, black list and device revocation list to the memory card 600 (step S142).

The input/output unit 601 of the memory card 600 receives the sub-content title ID, the encrypted sub-content key, the encrypted sub-content, the blacklist and the device revocation list from the main player 300 (step S142), and writes the received sub-content title ID, encrypted sub-content key, encrypted sub-content, blacklist and device revocation list in correspondence in the information storage unit 603 (step S143).

Figure 12:
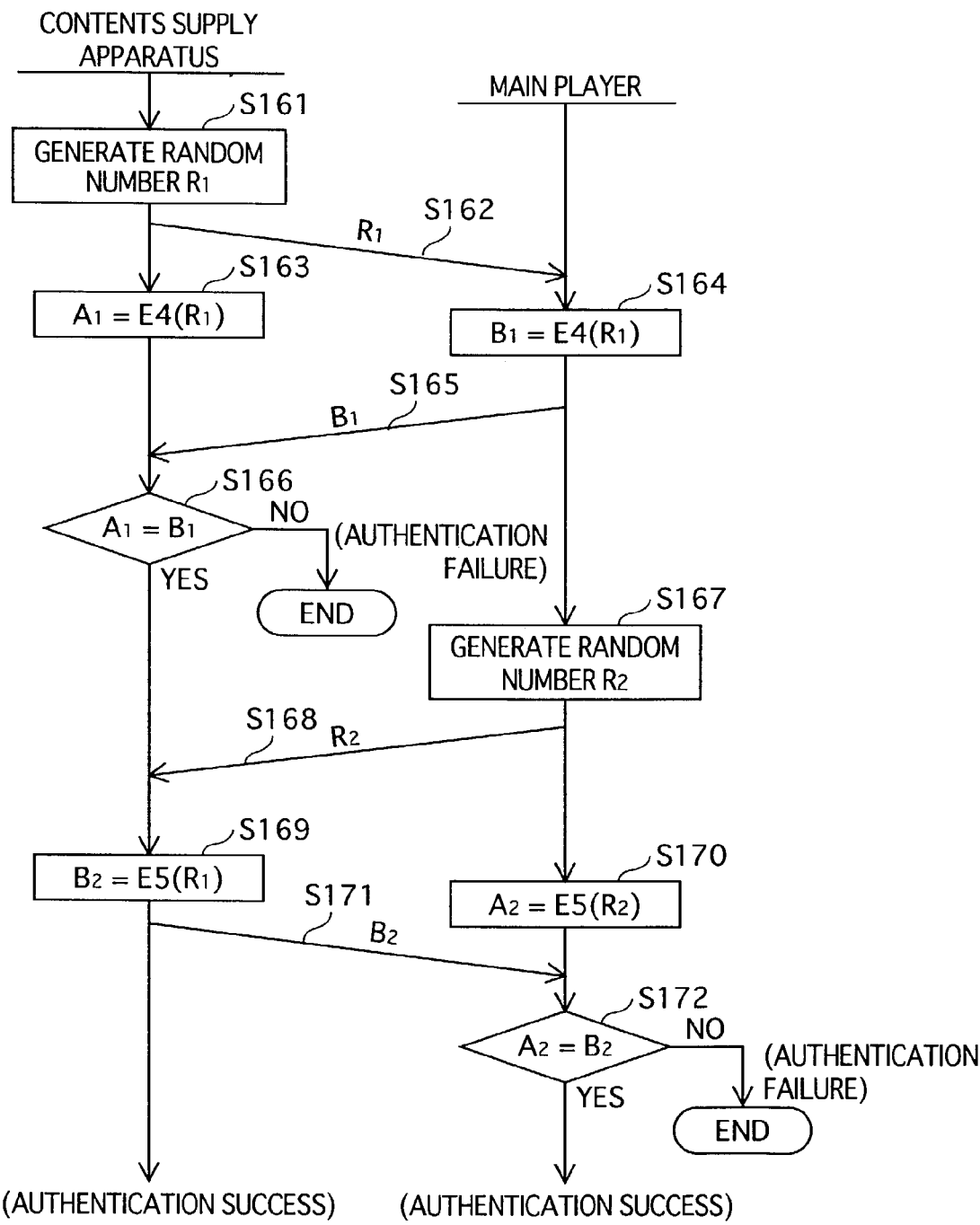
FIG. 12 is a flowchart showing operations for mutual authentication between the contents supply apparatus 200 and the main player 300.

1.8 Operations by the Contents Supply Apparatus 200 and the Main Player 300 for Mutual Authentication The following describes operations by the contents supply apparatus 200 and the main player 300 for mutual authentication, with use of the flowchart in FIG. 12. Note that the operations for mutual authentication described here are details of operations at steps S124 to S127 in the flowchart in FIG. 9.

Note that the authentication unit 208 of the contents supply apparatus 200 performs transmission and reception of information for mutual authentication with the authentication unit 304 via the transmission/reception unit 207, the Internet 10 and the transmission/reception unit 305 of the main player 300. Likewise, the authentication unit 304 of the main player 300 performs transmission and reception of information for mutual authentication with the authentication unit 208 of the contents supply apparatus 200 via the transmission/reception unit 305, the Internet 10 and the transmission/reception unit 207 of the contents supply apparatus 200. Note that in the following, information is simply described as being transmitted/received between the authentication unit 304 and the authentication unit 208, and mention of the paths therebetween is omitted.

The authentication unit 208 generates a random number R1 (step S161), and transmits the generated random number R1 to the authentication unit 304 (step S162). The authentication unit 208 generates a ciphertext A1 by applying an encryption algorithm E4 to the random number R1 (step s163).

On the other hand, the authentication unit 304 receives the random number R1 from the authentication unit 208 (step S162), and generates a cipher text B1 by applying the encryption algorithm to the received random number R1 (step S164), and transmits the generated ciphertext B1 to the authentication unit 208 (step S165).

Next, the authentication unit 208 receives the ciphertext B1 from the authentication unit 304 (step S165), and judges whether the generated ciphertext A1 and the received ciphertext B1 match. When the two do not match (step S166), the authentication unit 208 considers authentication to have failed, and outputs an instruction to the control unit 201 and the transmission/reception unit 207 to stop subsequent transmission and reception of information with the main player 300.

Meanwhile the authentication unit 304 generates a random number R2 (step S167), transmits the generated random number R2 to the authentication unit 208 (step S168), and generates a ciphertext A2 by applying an encryption algorithm E5 to the generated random number R2 (step S170).

Next when the authentication unit 208 judges that the generated ciphertext A1 and the received cipher text B1 match (step S166), the authentication unit 208 considers authentication to have succeeded, additionally receives the random number R2 from the authentication unit 304 (step S168), generates a ciphertext B2 by applying the encryption algorithm E5 to the received random number R2 (step S169), and transmits the generated ciphertext B2 to the authentication unit 304 (step S171).

Next, the authentication unit 304 receives the ciphertext B2 from the authentication unit 208 (step S171), judges whether the generated ciphertext A2 and the received ciphertext B2 match, an when the two match (step S172), considers authentication to have failed, and outputs an instruction to the control unit 301 and the transmission/reception unit 305 to stop subsequent transmission and reception of information with the contents supply apparatus 200.

When the two match (step S172), the authentication unit 304 considers authentication to have succeeded.

1.9 Operations by the Main Player 300 for Playing back Sub-content.

Figure 13:
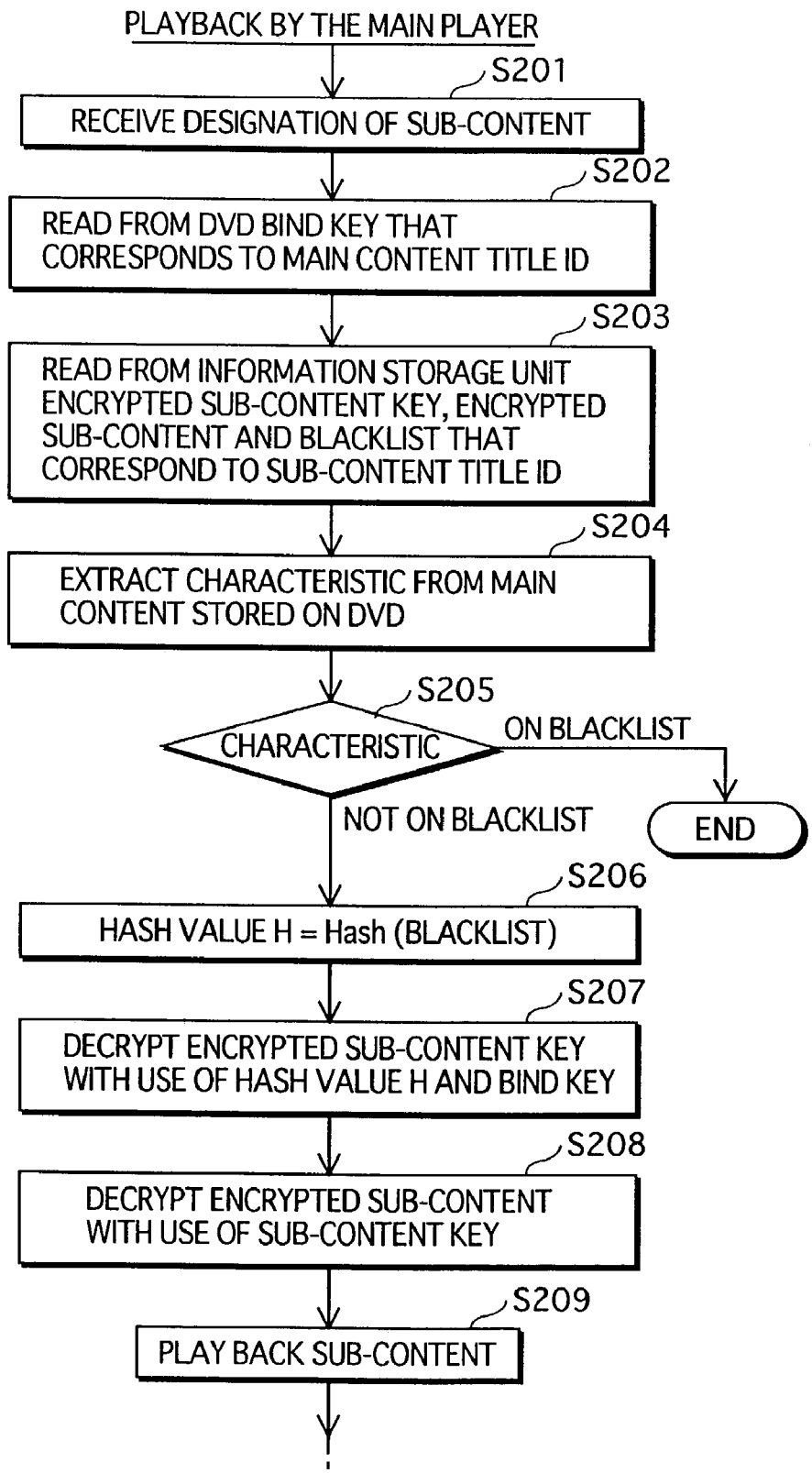
FIG. 13 is a flowchart showing operations by the main player 300 for playing back sub-content.

The following describes operations by the main player 300 for playing back sub-content, with use of the flowchart in FIG. 13.

The input unit 303 of the main player 300 receives a designation of sub-content to be played back from the user, acquires the title ID of the sub-content for which the designation was received, and outputs the acquired sub-content title ID to the control unit 301 (step S201).

Next, the control unit 301 generates a main content title ID from the received sub-content title ID, and outputs the generated main content title ID to the drive unit 307. The drive unit 307 receives the title ID from control unit 301, reads the bind key that corresponds to the received title ID from the DVD 500, and outputs the read bind key to the decryption unit 311 (step S202).

Next, the decryption unit 311 reads the encrypted sub-content key that corresponds to the sub-content title ID from the information storage unit 309, the decryption unit 313 reads the encrypted sub-content that corresponds to the sub-content title ID from the information storage unit 309, and the hash unit 315 reads the blacklist that corresponds to the sub-content title ID from the information storage unit 309 (step S203).

Next, the extraction unit 316 reads the encrypted main content from the DVD 500 via the drive unit 307, generates main content by decrypting the encrypted main content, and extracts a characteristic from the generated main content to generate characteristic information (step S204). The extraction unit 316 reads the blacklist from the information storage unit 309, and judges whether the generated characteristic information is included on the blacklist. When the generated characteristic information is included on the blacklist (step S205), the extraction unit 316 considers the DVD 500 to be a pirate disk, and outputs an instruction to the control unit 301 to stop subsequent processing. The control unit 301 controls the various compositional elements so as to stop subsequent processing. In this way, the main player 300 stops playback of the sub-content.

When the extraction unit 316 judges that the generated characteristic information is not included on the read blacklist (step S205), the hash unit 315 then reads the blacklist from the information storage unit 309, generates a hash value H=Hash (blacklist) by applying the hash function Hash to the read blacklist, and outputs the generated hash value H to the decryption unit 311 (step S206). The decryption unit 311 receives the bind key from the drive unit 307, receives the hash value H from the hash unit 315, and generates a key by connecting the received hash value H and the received bind key in the stated order. The decryption unit 311 then generates a sub-content key by applying the decryption algorithm D2 to the read encrypted sub-content using the generated key, and outputs the generated sub-content key to the decryption unit 313 (step S207).

The decryption unit 313 receives the sub-content key from the decryption unit 311, generates sub-content by applying the decryption algorithm D1 to the read encrypted sub-content using the received sub-content key, and outputs the generated sub-content to the playback unit 312 (step S208).

The playback unit 312 receives the sub-content, generates a video signal from the received sub-content and outputs the generated video signal to the monitor 351, and also generates an audio signal from the received sub-content and outputs the generated audio signal to the speaker 352 (step S209).

1.10 Operations by the Sub-Player 400 for Playing back the Sub-content

Figure 14:
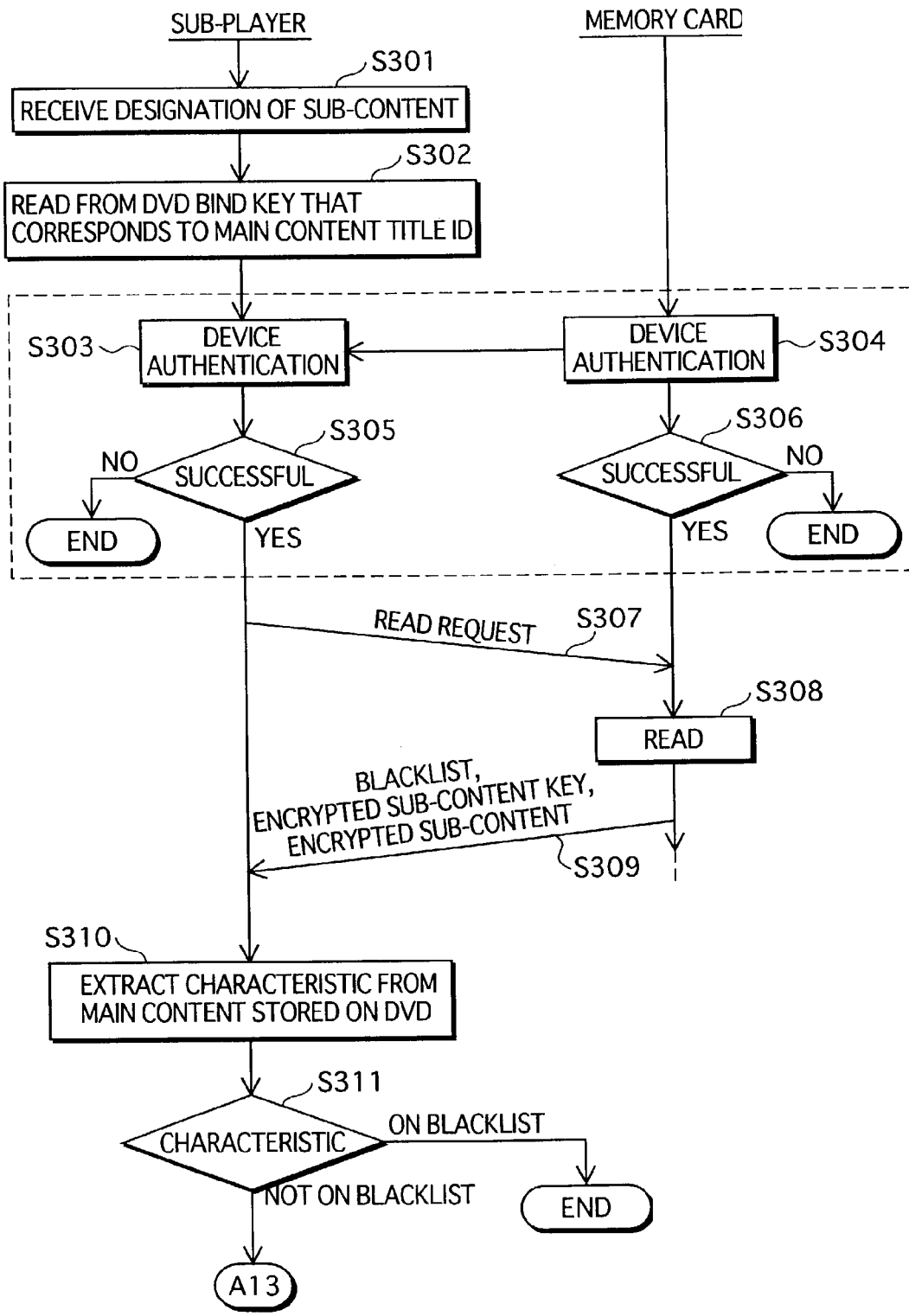
FIG. 14 is a flowchart showing operations by the sub-player 400 for playing back sub-content, and continues in FIG. 15.
Figure 15:
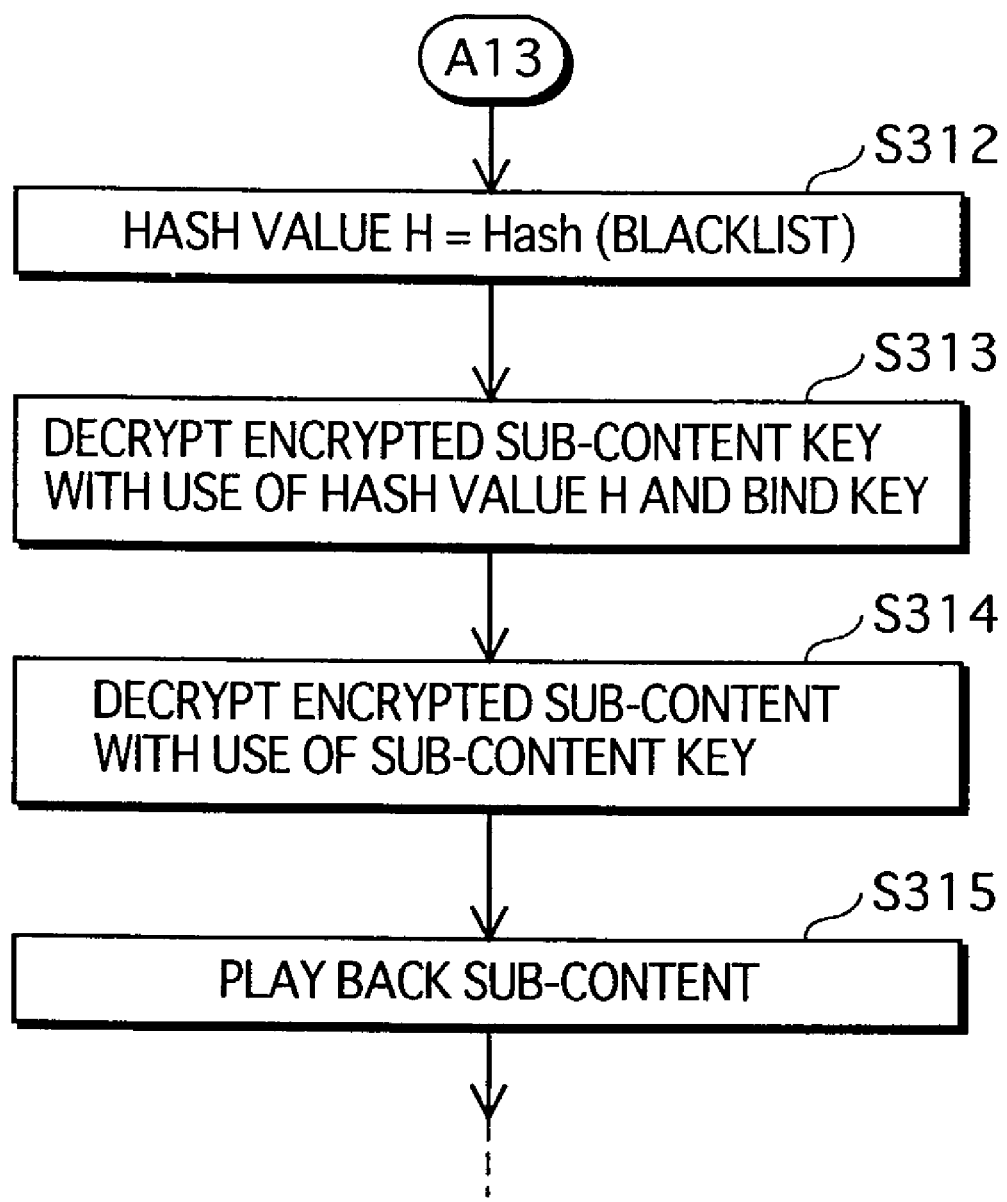
FIG. 15 is a flowchart showing operations by the sub-player 400 for playing back sub-content, and continues from FIG. 14.

The following describes operations by the sub-player 400 for playing back the sub-content, with use of the flowcharts shown in FIGS. 14 to 15.

The input unit 403 of the sub-player 400 receives a designation from the user of sub-content to be played back, acquires the title ID of the sub-content for which the designation was received, from the memory card 600, and outputs the acquired sub-content title ID to the control unit 401 (step S301).

Next, the control unit 401 generates a main content title ID from the received sub-content title ID, and outputs the generated main content title ID to the drive unit 407. The drive unit 407 receives the title ID from control unit 401, reads the bind key that corresponds to the received title ID from the DVD 500, and outputs the read bind key to the decryption unit 411 (step S302).

Next, the sub-player 400 and the memory card 600 perform mutual device authentication (steps S303 to S304). When mutual device authentication fails (steps S305, S306), the apparatuses stop subsequent processing.

When mutual device authentication succeeds (steps S305, S306), the input/output unit 410 outputs a request to the memory card 600 to read the blacklist, the encrypted sub-content key and the encrypted sub-content (step S307).

The input/output unit 601 of the memory card 600 receives the read request (step S307), reads the blacklist, the encrypted sub-content key and the encrypted sub-content from the information storage unit 603, and outputs the read blacklist, encrypted sub-content key and encrypted sub-content to the sub-player 400. The input/output unit 410 receives the blacklist, the encrypted sub-content key and the encrypted sub-content (step S309).

The extraction unit 416 reads the encrypted main content from the DVD 500 via the drive unit 407, generates main content by decrypting the encrypted main content, and extracts a characteristic from the generated main content to generate characteristic information (step S310). The extraction unit 416 receives the blacklist from the input/output unit 410, and judges whether the generated characteristic information is included on the blacklist. When the generated characteristic information is included on the blacklist (step S311), the extraction unit 416 considers the DVD to be a pirate disk, and outputs an instruction to the control unit 401 to stop subsequent processing. The control unit 401 controls the various compositional elements so as to stop subsequent processing. In this way, the sub-player 400 stops playback of the sub-content.

When the extraction unit 416 judges that the generated characteristic information is not included on the read blacklist (step S311), the hash unit 415 then receives the blacklist from the input/output unit 410, generates a hash value H=Hash (blacklist) by applying the hash function Hash to the received blacklist, and outputs the generated hash value H to the decryption unit 411 (step S312). The decryption unit 411 receives the bind key from the drive unit 407, receives the hash value H from the hash unit 415, and generates a key by connecting the received hash value H and the received bind key in the stated order. The decryption unit 411 then generates a sub-content key by applying the decryption algorithm D2 to the read encrypted sub-content using the generated key, and outputs the generated sub-content key to the decryption unit 413 (step S313).

The decryption unit 413 receives the sub-content key from the decryption unit 411, generates sub-content by applying the decryption algorithm D1 to the read encrypted sub-content using the received sub-content key, and outputs the generated sub-content to the playback unit 412 (step S314).

The playback unit 412 receives the sub-content, generates a video signal from the received sub-content and outputs the generated video signal to the monitor 417, and also generates an audio signal from the received sub-content and outputs the generated audio signal to the speaker 451 (step S315).

Figure 16:
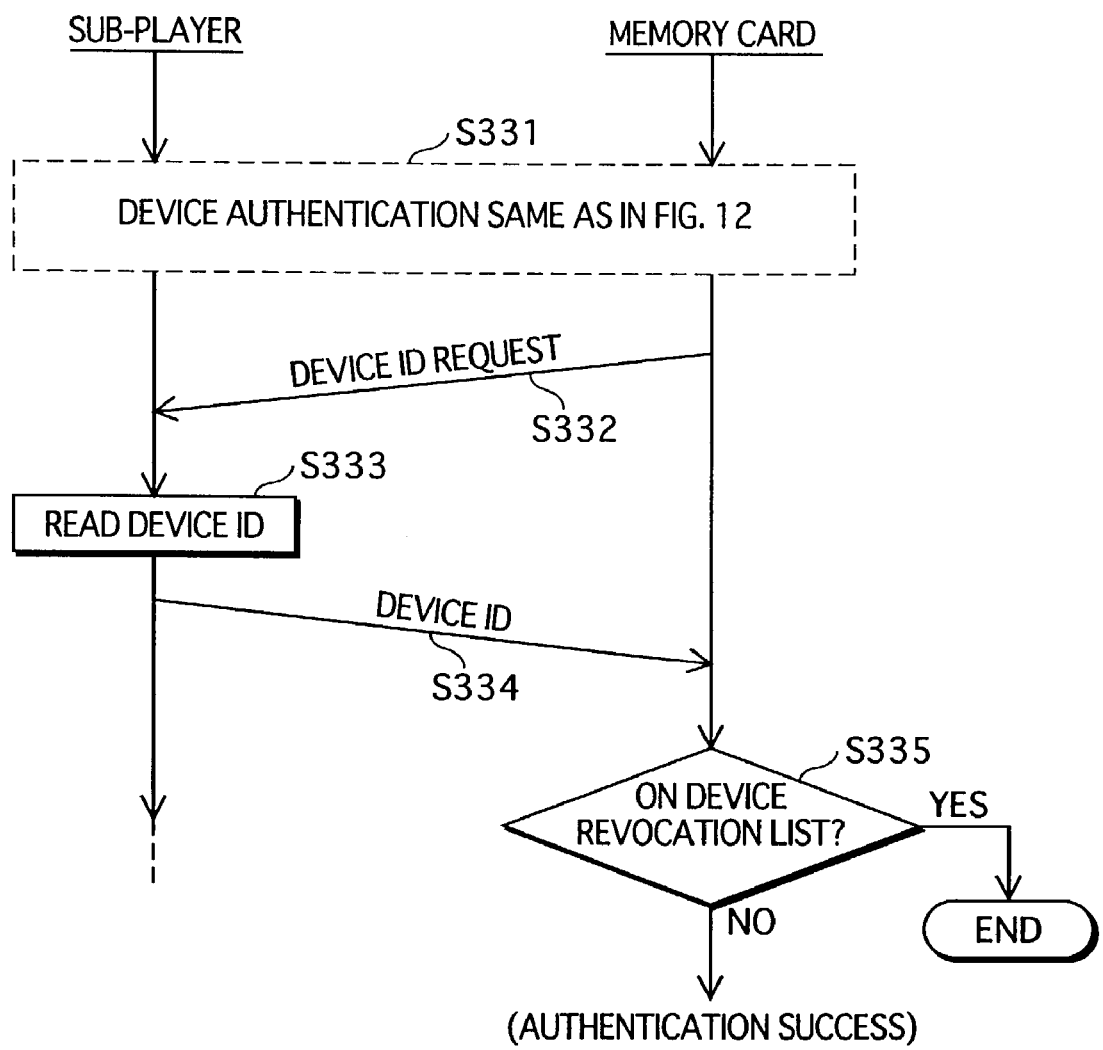
FIG. 16 is a flowchart showing operations for mutual authentication between the sub-player 400 and the memory card 600.

1.12 Operations by the Sub-player 400 and the Memory Card 600 for Mutual Authentication The following describes operations by the sub-player 400 and the memory card 600 for mutual authentication, with use of the flowchart in FIG. 16. Note that the operations for mutual authentication described here are details of operations at steps S303 to S306 in the flowchart in FIG. 14.

The authentication unit 414 of the sub-player 400 performs transmission and reception of information for mutual authentication with the authentication unit 602 via the input/output unit 410 and the input/output unit 601 of the memory card 600. Likewise, the authentication unit 602 of the memory card 600 performs transmission and reception of information for mutual authentication with the authentication unit 414 via the input/output unit 600 and the input/output unit 410 of the sub-player 400. Note that in the following, information is simply described as being transmitted/received between the authentication unit 414 and the authentication unit 602, and mention of the paths therebetween is omitted.

The authentication unit 414 and the authentication unit 602 perform device authentication using the same method as the mutual authentication shown in the flowchart in FIG. 12 (step S331).

When mutual device authentication succeeds, the authentication unit 602 requests a device ID from the authentication unit 414 (step S332).

The authentication unit 414 receives the request (step S332), reads the device ID from the ID storage unit 418 (step S333), and outputs the read device ID to the authentication unit 602 (step S334).

The authentication unit 602 receives the device ID (step S334), judges whether the received device ID is included on the device revocation list 625 stored in the information storage unit 603, and when the device ID is not included (step S335), considers authentication to have succeeded.

When the device ID is included (step S335), the authentication unit 602 considers the sub-player 400 to be a revoked apparatus, and the controls the input/output unit 601 so as to stop subsequent processing.

2. Modifications

Note that although the present invention has been described based on the above embodiment, the present invention is not limited to the embodiment. The following cases are included in the present invention.

(1) A user legally purchases, and thus possesses, a DVD on which a movie "Galaxy Wars: The Birth of the Galaxy Allies" is recorded as the main content. The main player acquires according to user instruction a short movie "Galaxy Wars: The Secret Story of the Birth of the Galaxy Allies", which is sub-content of the main content "Galaxy Wars: The Birth of the Galaxy Allies". The main player then encrypts the sub-content and writes the encrypted sub-content to the memory card, as described in the above embodiment.

The main player plays back the encrypted sub-content written to the memory card, according to user instruction, only when both the DVD to which "Galaxy Wars: The Birth of the Galaxy Allies" is written and the memory card to which the sub-content is written are mounted in the main player, as described in the above embodiment. This enables the user to playback and enjoy the short movie "Galaxy Wars: The Secret Story of the Birth of the Galaxy Allies". This applies to the sub-player also.

Here, the user rents DVDs on which a movies "Galaxy Wars: The Takeover" and "Galaxy Wars: The Demise of the Allies" are respectively recorded as main content. These movies are sequels of "Galaxy Wars: The Birth of the Allies".

When the user has mounted both the memory card on which the encrypted sub content is recorded and the rented DVD on which "Galaxy Wars: The Demise of the Allies" is recorded in the main player, the main player plays back the encrypted sub-content written to the memory card, according to user instruction. In this case also, the user is able to playback and enjoy the short movie "Galaxy Wars: The Secret Story of the Birth of the Galaxy Allies". This also applies to the sub-player.

In this way, as described in the above embodiment, when the user legitimately possesses, by legally purchasing or the like, a DVD on which main content A is recorded, sub-content B that relates to the main content A can be acquired by the main player from the contents supply apparatus, and written to the memory card.

Next, suppose that the user acquires DVDs on which main content C and D, which relate to main content A, are respectively recorded, by a legitimate method other than purchasing, such as rental. Here, sub-content is chargeable, and when the memory card and the DVD on which the main content C is recorded are both mounted in the main player, the main player is able to play back the sub-content recorded on the memory card. This is the same when both the memory card and the DVD on which the main content D is recorded are mounted in the main player. Furthermore, this also applies to the sub-player.

The following describes a specific structure for realizing the above-described modification.

Figure 17:
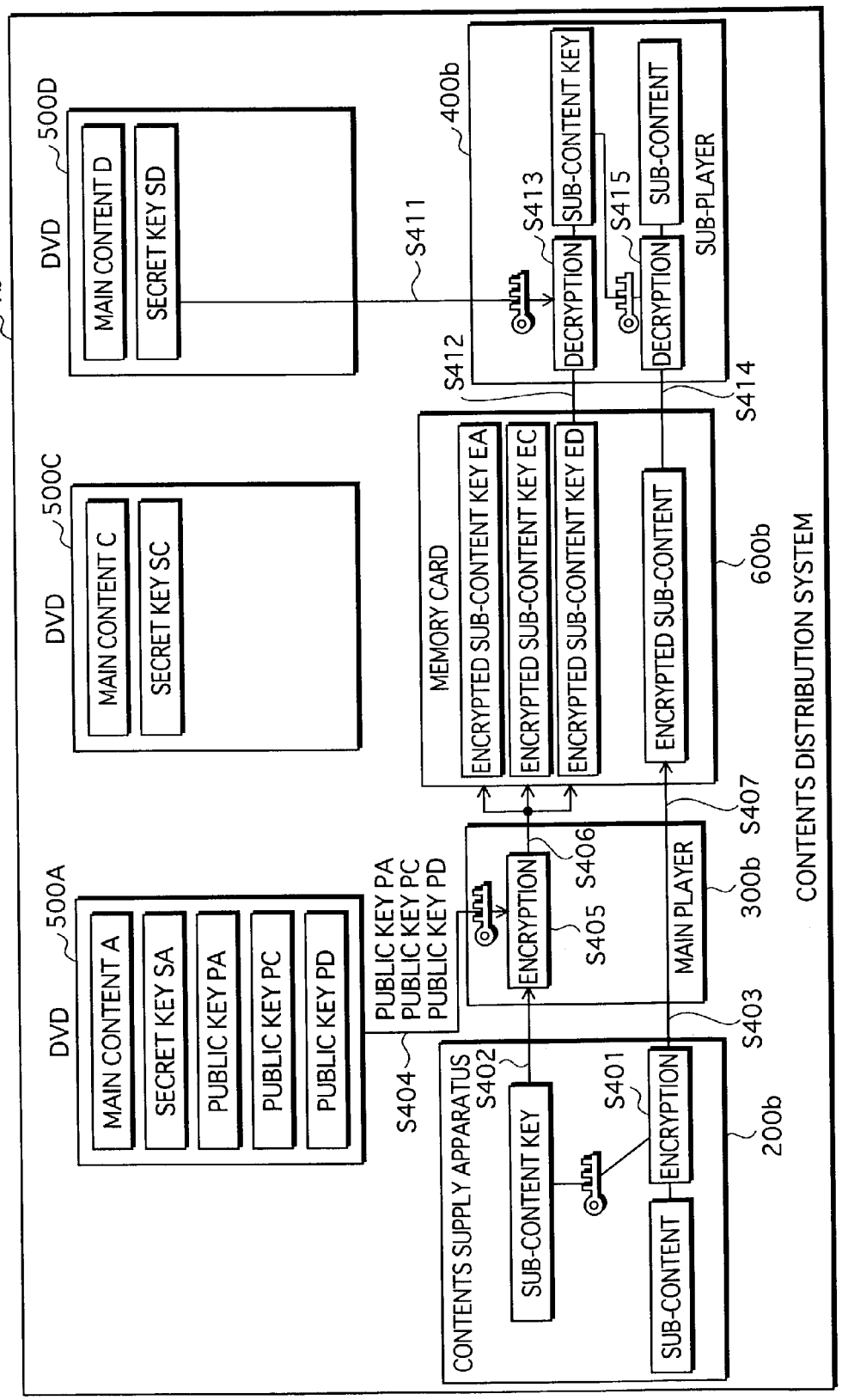
FIG. 17 shows the structure and operations of a contents distribution system 1*b* as an example of a modification.

A contents distribution system 1b has a similar structure to the contents distribution system 1, but instead of the contents supply apparatus 200, the main player 300 and the sub-player 400, the contents distribution system 1b includes a contents supply apparatus 200b, a main player 300b and a sub-player 400b, as shown in FIG. 17.

The user purchases a DVD 500A legally. In addition, the user rents a DVD 500C and a DVD 500D.

Main content A, a secret key SA, a public key PA, a public key PC and a public key PD are recorded on the DVD 500A. Here, the secret key SA is a secret key that corresponds to the main content A, and the public key PA is a public key that corresponds to the main content A. Furthermore, the public key PC and the public key PD are public keys that correspond respectively to main content C and main content D that are described later.

The main content C and a secret key SC are recorded on the DVD 500C. The main content C is content that relates to the main content A. The secret key SC is a secret key that corresponds to the main content C.

The main content D and a secret key SD are recorded on the DVD 500D. The main content D is content that relates to the main content A. The secret key SD is a secret key that corresponds to the main content D.

The secret keys and the public keys comply with the public key encryption method.

The public key PA is used for encrypting plaintext. The secret key SA corresponds to the public key PA, and is used for decrypting a ciphertext that was generated using the public key PA.

Furthermore, the public key PC is used for encrypting plaintext. The secret key SC corresponds to the public key PC, and is used for decrypting a ciphertext that was generated using the public key PC.

In addition, the public key PD is used for encrypting plaintext. The secret key SD corresponds to the public key PD, and is used for decrypting a ciphertext that was generated using the public key PD.

The user mounts the DVD 500A and the memory card 600 in the main player 300b, and instructs the main player 300b to acquire sub-content that relates to the main content A from the contents supply apparatus 200b. Information has not yet been recorded on the memory card 600b at this point.

The main player 300b outputs an instruction to the contents supply apparatus 200b to acquire sub-content. The contents supply apparatus 200b generates encrypted sub-content by encrypting the sub-content using the sub-content key (step S401). Next, the contents supply apparatus 200b supplies the main player 300b with the sub-content key (step S402), and supplies the main player 300b with the encrypted sub-content (step S403).

The main player 300b acquires the sub-content key from the contents supply apparatus 200b (step S402), and acquires the encrypted sub-content from the contents supply apparatus 200b (step S403) Next, the main player 300b reads the public key PA, the public key PC and the public key PD from the DVD 500A (step S404), and generates an encrypted sub-content key EA, an encrypted sub-content key EC and an encrypted sub-content key ED by encrypting the received sub-content key respectively using the read public key PA, public key PC and public key PD (step S405). The main player 300b writes the generated encrypted sub-content key EA, encrypted sub-content key EC and encrypted sub-content key ED to the memory card 600b (step S406), and then writes the received encrypted sub-content to the memory card 600b (step S407).

In this way, the encrypted sub-content key EA, the encrypted sub-content key EC, the encrypted sub-content key ED and the encrypted sub-content are recorded on the memory card 600b as shown in FIG. 17.

Next, the user mounts both the memory card 600b on which the encrypted sub-content key EA, the encrypted sub-content key EC, the encrypted sub-content key ED and the encrypted sub-content are recorded and the DVD 500D in the sub-player 400b, and instructs the sub-player to play back the encrypted sub-content that is recorded on memory card 600b.

The sub-player 400b reads the secret key SD from the DVD 500 (step S411), reads the encrypted sub-content key ED from memory card 600b (step S412), and generates a sub-content key by decrypting the encrypted sub-content key ED using the read secret key SD (step S413). Next, the sub-player 400b reads the encrypted sub-content from the memory card 600b (step S414), and generates sub-content by decrypting the read encrypted sub-content using the generated sub-content key (step S415). Next, the sub-player 400b plays back the sub-content.

In this way, the sub-player 400b is able to decrypt and play back encrypted sub-content recorded on the memory card 600b when both the memory card 600b and the DVD 500D are mounted. The main player 300b plays back in the same way.

Furthermore, the same applies to when both the memory card 600b and the DVD 500A are mounted in the sub-player 400b. Furthermore, the same applies to when both the memory card 600b and the DVD 500C are mounted in the sub-player 400b. Furthermore, the same applies to the sub-player 300b.

(2) A disk ID that uniquely identifies the DVD 500 may be recorded on the DVD 500. In this case, when the main player 300 requests sub-content from the contents supply apparatus 200, the main player 300 reads the disk ID from the DVD 500, and transmits the read disk ID to the contents supply apparatus 200. When supplying the main player 300 with the sub-contents, the contents supply apparatus 200 may store the received disk ID and the sub-content in correspondence.

The contents supply apparatus 200 may have a structure by which when it next receives a request for sub-content from the contents supply apparatus 200, it does not permit supply of the sub-content of the received combination of title ID and disk ID. This prevents sub-content being supplied in duplicate.

Furthermore, it is also possible for the supplier of the sub-content to request separate payment from the user for the sub-content in the case of a same combination of title ID and disk ID.

(3) The sub-player 400 may have an internal storage unit such as a hard disk, read encrypted sub-content stored on the memory card 600, and store the read encrypted sub-content in the storage unit.

(4) The main player 300 may read a bind key from the DVD 500 and store the read bind key internally. Here, the main player 300 encrypts the sub-content key with use of the internally-stored bind key. Furthermore, when playing back sub-content, the main player 300 may decrypt encrypted content with use of the internally-stored bind key. This also applies to the sub-player 400.

(5) In the above-described embodiment, the main player 300 receives the sub-content and the blacklist, and writes the received sub-content and blacklist to the information storage unit 309, or writes the received sub-content and blacklist to the memory card 600.

Here, when the main player 300 next receives another sub-content and another blacklist, the main player 300 may write the received sub-content to the information storage unit 309, and write the received blacklist over the blacklist that is already being stored in the information storage unit 309. Alternatively, the main player may write the received sub-content to the memory card 600, and write the received blacklist over the blacklist that is already being stored in the information storage unit 309.

In this way, the main player 300 and the memory card 600 store only the most recent of the blacklists that are transmitted.

(6) The following is a possible structure for when the main player 300 acquires sub-content from the contents supply apparatus 200.

When the contents supply apparatus 200 and the main player 300 perform mutual device authentication according the respective authentication unit 208 and authentication unit 304, they share a session key Kses. Specifically, in the mutual authentication process between the contents supply apparatus 200 and the main player 300 shown in FIG. 12, the authentication unit 208 and the authentication unit 304 in the contents supply apparatus 200 and the main player 300, respectively, calculate the session key Kses using the following expression.

Session key $Kses=E6(R1(+)R2)$

Here, R1 and R2 are random numbers acquired by the contents supply apparatus 200 and the main player 300 in the mutual authentication process shown in FIG. 12.

Furthermore, (+) is an operator that shows an exclusive OR.

Furthermore, $Y=E6(X)$ shows ciphertext Y acquired by applying an encryption algorithm E6 to plaintext X. Here, the encryption algorithm E6 is, for example, DES encryption.

Next, the main player 300 generates an encrypted bind key by encrypting the bind key read from the DVD 500 using the session key Kses, and transmits the encrypted bind key to the contents supply apparatus 200.

The contents supply apparatus 200 receives the encrypted bind key, and generates a bind key by decrypting the encrypted bind key using the session key Kses.

Next, the contents supply apparatus 200 (a) generates an encrypted sub-content key by encrypting the sub-content with use of the bind key, and then generates a double-encrypted sub-content key by further encrypting the encrypted sub-content key using the session key Kses, (b) generates encrypted sub-content by encrypting the sub-content using the sub-content key, and then generates double-encrypted sub-content by further encrypting the encrypted sub-content using the session key Kses, and (c) generates an encrypted blacklist by encrypting the blacklist using the session key Kses. The contents supply apparatus 200 then transmits the double-encrypted sub-content key, the double-encrypted sub-content and the encrypted black list to the main player 300.

Next, the main player 300 receives the double-encrypted sub-content key, the double-encrypted sub-content and the encrypted black list. The main player 300 then (a) generates an encrypted sub-content key by decrypting the double-encrypted sub-content key using the session key Kses, (b) generates encrypted sub-content by decrypting the double-encrypted sub-content using the session key Kses, and (c) generates a blacklist by decrypting the encrypted blacklist using the session key Kses.

Next, the main player 300 writes the sub-content title ID, the encrypted sub-content key, the encrypted sub-content and the blacklist to the information storage unit 309. Furthermore, the main player 300 writes the sub-content title ID, the encrypted sub-content key, the encrypted sub-content and the blacklist to the memory card 600.

The main player 300 writes the encrypted sub-content to the memory card 600 in the following way.

When mutual device authentication is performed between the main player 300 and the memory card 600, the session key Kses is shared by the authentication unit 314 and the authentication unit 602, in the manner described earlier.

The main player 300 (a) generates a double-encrypted sub-content key by encrypting the sub-content using the session key Kses, (b) generates double-encrypted sub-content by encrypting the encrypted sub-content using the session key Kses, and (c) generates an encrypted blacklist by encrypting the blacklist using the session key Kses. Then the main player 300 transmits the sub-content title ID, the double-encrypted sub-content key, the double-encrypted sub-content and the encrypted black list to the memory card 600.

The memory card 600 receives the sub-content title ID, the double-encrypted sub-content key, the double-encrypted sub-content and the encrypted black list. The memory card 600 (a) generates an encrypted sub-content key by decrypting the double-encrypted sub-content key using the session key Kses, (b) generates encrypted sub-content by decrypting the double-encrypted sub-content using the session key Kses, and (c) generates a blacklist by decrypting the encrypted blacklist with use of the session key Kses. Next, the memory card 600 writes the sub-content title ID, the encrypted sub-content key, the encrypted sub-content and the blacklist to the information storage unit 603.

Furthermore, the main player 300 reads the encrypted sub-content from the memory card 600 in the following manner.

When mutual device authentication is performed between the main player 300 and the memory card 600, the session key Kses is shared by the authentication unit 314 and the authentication unit 602, in the manner described earlier.

The memory card 600 (a) generates a double-encrypted content key by encrypting the encrypted sub-content using the session key Kses, (b) generates double-encrypted sub-content by encrypting the encrypted sub-content using the session key Kses, and (c) generates an encrypted blacklist by encrypting the blacklist using the session key Kses. Next, the memory card 600 transmits the sub-content title ID, the double-encrypted sub-content key, the double-encrypted sub-content and the encrypted blacklist to the main player 300.

The main player 300 receives the sub-content title ID, the double-encrypted sub-content key, the double-encrypted sub-content and the encrypted blacklist. The main player 300 (a) generates an encrypted sub-content key by decrypting the double-encrypted sub-content key using the session key Kses, (b) generates encrypted sub-content by decrypting the double-encrypted sub-content using the session key Kses, and (c) generates a blacklist by decrypting the encrypted blacklist using the session key Kses.

(7) Although the sub-content is encrypted using the sub-content key in the embodiments, it is not mandatory for a sub-content key to exist.

In other words, the contents supply apparatus 200 may generate encrypted sub-content by encrypting the sub-content using the bind key, and transmit the generated encrypted sub-content to the main player 300.

The main player 300 receives the encrypted sub-content, and stores the encrypted content in the information storage unit 300 and the memory card 600. When playing back the encrypted sub-content, the main player 300 generates the sub-content by decrypting the encrypted content with use of the bind key, and plays back the generated sub-content.

Although the recording medium on which the main content is recorded is described as being ROM-type DVD to which information can only be written once, another type of recording medium may be used. For example, the use of a ROM-type BD (Blu-ray Disc) is possible, as is a CD-ROM. Furthermore, the recording medium to which the main content is recorded is not limited to being a ROM-type recording medium. A readable/writable recording medium may be used.

(9) The present invention may be methods shown by the above. Furthermore, the methods may be a computer program realized by a computer, and may be a digital signal of the computer program.

Furthermore, the present invention may be a computer-readable recording medium apparatus such as a flexible disk, a hard disk, a CD-ROM, an MO, a DVD, a DVD-ROM, a DVD RAM, a BD (Blu-Ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(10) The present invention may be any combination of the above-described embodiments and modifications.

3. Effects of the Invention

As has been described, the present invention is a contents distribution system that distributes sub-content relating to main content, including:

a contents supply apparatus that outputs the sub-content;

a contents recording apparatus that (a) reads unique information from a portable first storage medium, the first storage medium pre-storing the unique information and a digital work that is the main content, the unique information being unique to the first storage medium, (b) acquires the output sub-content, (c) encrypts the acquired sub-content based on the read unique information, to generate encrypted sub-content, and (d) writes the generated encrypted sub-content to a portable second storage medium; and a contents playback apparatus that (a) reads the unique information from the first storage medium, (b) reads the encrypted sub-content from the second storage medium, (c) decrypts the read encrypted sub-content based on the read unique information, to generate playback sub-content, and (d) plays back the generated playback sub-content.

Furthermore, the present invention is a contents recording apparatus that records sub-content relating to main content, including:

a reading unit operable to read unique information from a portable first storage medium, the first storage medium storing the unique information and a digital work that is the main content, the unique information being unique to the first storage medium;

an acquisition unit operable to acquire the sub-content;

an encryption unit operable to encrypt the acquired sub-content based on the unique information, to generate encrypted sub-content; and a writing unit operable to write the generated encrypted sub-content to a portable second storage medium.

Furthermore, the present invention is a contents playback apparatus that plays back sub-content relating to main content, including:

a first reading unit operable to read unique information from a portable first storage medium, the first storage medium pre-storing the unique information and the main content that is a digital work, the unique information being unique to the first storage medium;

a second reading unit operable to read encrypted sub-content from a portable second storage medium, the second storage medium pre-storing the encrypted sub-content, the encrypted sub-content having been generated by encrypting the sub-content based on the unique information;

a decryption unit operable to decrypt the read encrypted sub-content based on the read unique information, to generate playback sub-content; and a playback unit operable to play back the generated playback sub-content.

According to the stated structures, the contents recording apparatus generates encrypted sub-content by encrypting the sub-content based on the unique information stored on the first storage medium, and writes encrypted content to a portable second storage medium. The contents playback apparatus decrypts the encrypted sub-content based on the unique information read from the first storage medium. Therefore, the contents playback apparatus is able to decrypt the encrypted sub-content only when both the first storage medium and the second storage medium are mounted in the contents playback apparatus. In this way, only the owner of the first storage medium that stores the main content is permitted to use the sub-content.

Here, in the contents recording apparatus, the acquisition unit further acquires a blacklist that is bound to the sub-content, the blacklist including characteristic information about a characteristic of information that has been recorded on an illegal recording medium, the illegal recording medium having recorded thereon illegal content generated by illegally copying the main content, and the writing unit writes the blacklist to the second storage medium, bound to the encrypted sub-content.

Furthermore, in the contents playback apparatus, the second reading unit further reads a blacklist from the second recording medium, the second recording medium further storing the blacklist bound to the encrypted sub-content, the black list including characteristic information about a characteristic of information that has been recorded on an illegal recording medium, the illegal recording medium having recorded thereon illegal content generated by illegally copying the main content, and the playback unit extracts characteristic information showing a characteristic of information stored on the first storage medium, judges whether the extracted characteristic information matches the characteristic information in the blacklist, and when the judgement is positive, prohibits playback of the playback sub-content and the information recorded on the first storage medium.

According to the stated structure, the contents recording apparatus writes a blacklist, which includes characteristic information showing a characteristic of information recorded on an illegal recording medium, to a second storage medium, bound to the encrypted sub-content. The contents playback apparatus extracts the characteristic information from the first storage medium, and when the extracted characteristic information is judged to be included in the blacklist, prohibits playback of the playback sub-content and the information stored on the first storage medium. In this way, playback of content recorded on an illegal recording medium can be controlled.

Here, in the contents recording apparatus, the acquisition unit further acquires device revocation information that is bound to the sub-content, the device revocation information showing a revoked device, and the writing unit writes the device revocation information to the second storage medium, bound to the encrypted sub-content.

Furthermore, in the contents playback apparatus, the second storage medium includes an information storage unit and a device authentication unit, the information storage unit stores the encrypted sub-content and device revocation information bound to the encrypted sub-content, the device revocation information showing a revoked device, and the device authentication unit judges, based on the device revocation information, whether the contents playback apparatus is revoked, and when the judgement is positive, prohibits reading of information from the information storage unit by the contents playback apparatus.

According to the stated structures, the contents recording apparatus writes device revocation information, which shows a revoked device, to a second storage medium, bound to the encrypted sub-content. The second storage medium judges whether the contents playback apparatus is revoked, and when the contents playback apparatus is judged to be revoked, prohibits playback by the contents playback apparatus of the information stored on the second storage medium. In this way, an illegal contents playback apparatus can be excluded.

Although the present invention has been fully described by way of examples with reference to the accompanying drawings, it is to be noted that various changes and modifications will be apparent to those skilled in the art. Therefore, unless otherwise such changes and modifications depart from the scope of the present invention, the should by construed as being included therein.

What is claimed is:

1. A contents distribution system, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents distribution system comprising:

a contents supply apparatus;

a contents acquisition apparatus; and a contents playback apparatus, wherein the contents supply apparatus comprises:

a storage unit operable to store sub-content and a sub-content key for the sub-content;

an encryption unit operable to encrypt the sub-content with use of the sub-content key to generate encrypted sub-content; and a transmission unit operable to transmit the sub-content key and the encrypted sub-content, the contents acquisition apparatus comprises:

a reception unit operable to receive the sub-content key and the encrypted sub-content;

a reading unit operable to read, from the first recording medium, the encryption key for sub-content pertaining to the first recording medium, and the plurality of encryption keys for sub-content pertaining to the plurality of second recording media;

an encryption unit operable to repeatedly encrypt the received sub-content key with use of the read plurality of encryption keys for sub-content, to generate an encrypted sub-content key with each of the encrypted keys, thereby generating a plurality of encrypted sub-content keys; and a writing unit operable to write the received encrypted sub-content and the plurality of generated encrypted sub-content keys to a portable memory card, and the contents playback apparatus, adapted to have mounted therein the first recording medium or one of the plurality of second recording media, comprises:

a first reading unit operable to read the decryption key for sub-content pertaining to the first recording medium from the first recording medium, or read the decryption key for sub-content pertaining to the second recording medium from the second recording medium;

a second reading unit operable to read, from the memory card, the encrypted sub-content and from among the encrypted sub-content keys stored in the memory card, one of the plurality of encrypted sub-content keys that corresponds to the mounted recording medium;

a first decryption unit operable to decrypt, with use of the read decryption key, the encrypted sub-content key read from the memory card, to generate a decrypted sub-content key;

a second decryption unit operable to decrypt, with use of the generated decrypted sub-content key, the encrypted sub-content read from the memory card, to generate decrypted sub-content; and a playback unit operable to play back the generated decrypted sub-content.

2. A contents acquisition apparatus for acquiring sub-content from a contents supply apparatus, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents acquisition apparatus comprising:

a reception unit operable to receive, from the contents supply apparatus, a sub-content key and encrypted sub-content that has been generated by encrypting the sub-content with use of the sub-content key;

a reading unit operable to read, from the first recording medium, the encryption key for sub-content pertaining to the first recording medium, and the plurality of encryption keys for sub-content pertaining to the plurality of second recording media;

an encryption unit operable to repeatedly encrypt the received sub-content key with use of the read plurality of encryption keys for sub-content, to generate an encrypted sub-content key with each of the encryption keys, thereby generating a plurality of encrypted sub-content keys; and a writing unit operable to write the received encrypted sub-content and the generated plurality of encrypted sub-content keys to a portable memory card.

3. The contents acquisition apparatus of claim 2, wherein the encryption keys and the decryption keys are public keys and private keys, respectively, in a public key method, and the encryption unit is operable to encrypt the received sub-content key according to public key encryption with use of the plurality of public keys recorded on the first recording medium to generate a plurality of encrypted sub-content keys.

4. A contents playback apparatus for playing back sub-content recorded on a memory card, wherein in circulation are first main content and a plurality of second main content, the first main content being held legitimately by a portable first recording medium, and each of the second main content being held legitimately by a different one of a plurality of second recording media, the first recording medium storing the first main content,
a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents playback apparatus, adapted to have mounted therein the first recording medium or one of the second recording media, comprising:

a first reading unit operable to read the decryption key for sub-content pertaining to the first recording medium from the first recording medium, or read the decryption key for sub-content pertaining to the second recording medium from the second recording medium;

a second reading unit operable to read, from the memory card storing encrypted sub-content and a plurality of encrypted sub-content keys, the encrypted sub-content and from among the encrypted sub-content keys stored in the memory card, one of the plurality of encrypted sub-content keys corresponding to the mounted recording medium;

a first decryption unit operable to decrypt, with use of the read decryption key, the encrypted sub-content key read from the memory card, to generate a decrypted sub-content key;

a second decryption unit operable to decrypt, with use of the generated decrypted sub-content key, the encrypted sub-content read from the memory card, to generate decrypted sub-content; and a playback unit operable to play back the generated decrypted sub-content.

5. The contents playback apparatus of claim 4, wherein the encryption keys and the decryption keys are public keys and private keys, respectively, in a public key method, the plurality of encrypted sub-content keys written on the memory card has been generated by encrypting, according to public key encryption, a sub-content key received from a contents supply apparatus, with use of the plurality of public keys recorded on the first recording medium, and the first decryption unit is operable to decrypt, according to a public key decryption method, one of the plurality of encrypted sub-content keys written on the memory card, with use of a private key read from the mounted recording medium, to generate the decrypted sub-content key.

6. A contents acquisition method used in a contents acquisition apparatus for acquiring sub-content from a contents supply apparatus, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents acquisition method comprising:

a reception step of receiving, from the contents supply apparatus, a sub-content key and encrypted sub-content that has been generated by encrypting the sub-content with use of the sub-content key;

a reading step of reading, from the first recording medium, the encryption key for sub-content pertaining to the first recording medium, and the plurality of encryption keys for sub-content pertaining to the plurality of second recording media;

an encryption step of repeatedly encrypting the received sub-content key with use of the read plurality of encryption keys for sub-content, to generate an encrypted sub-content key with each of the encryption keys, thereby generating a plurality encrypted sub-content keys; and a writing step of writing the received encrypted sub-content and the generated plurality of encrypted sub-content keys to a portable memory card.

7. A contents acquisition program recorded on a computer-readable recording medium and used in a contents acquisition apparatus for acquiring sub-content from a contents supply apparatus, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents acquisition program comprising:

a reception step of receiving, from the contents supply apparatus, a sub-content key and encrypted sub-content that has been generated by encrypting the sub-content with use of the sub-content key;

a reading step of reading, from the first recording medium, the encryption key for sub-content pertaining to the first recording medium, and the plurality of encryption keys for sub-content pertaining to the plurality of second recording media;

an encryption step of repeatedly encrypting the received sub-content key with use of the read plurality of encryption keys for sub-content, to generate an encrypted sub-content key with each of the encryption keys, thereby generating a plurality encrypted sub-content keys; and a writing step of writing the received encrypted sub-content and the generated plurality of encrypted sub-content keys to a portable memory card.

8. A contents playback method used in a contents playback apparatus for playing back sub-content recorded on a memory card, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content Pertaining to the plurality of second recording media, and each of the second recording media storing a second corresponding main content and a decryption key for sub-content pertaining to the corresponding second recording medium, the contents playback method comprising:

a first reading step of reading the decryption key for sub-content pertaining to the first recording medium from the first recording medium, or reading the decryption key for sub-content pertaining to the second recording medium from the second recording medium;

a second reading step of reading, from the memory card storing encrypted sub-content and a plurality of encrypted sub-content keys, the encrypted sub-content and from among the encrypted sub-content keys stored in the memory card, one of the plurality of encrypted sub-content keys corresponding to the mounted recording medium;

a first decryption step of decrypting, with use of the read decryption key, the encrypted sub-content key read from the memory card, to generate a decrypted sub-content key;

a second decryption step of decrypting, with use of the generated decrypted sub-content key, the encrypted sub-content read from the memory card, to generate decrypted sub-content; and a playback step of playing back the generated decrypted sub-content.

9. A contents playback program recording on a computer-readable recording medium and used in a contents playback apparatus for playing back sub-content recorded on a memory card, wherein in circulation are first main content and a plurality of second main content, the first main content being held legitimately by a portable first recording medium, and each of the second main content being held legitimately by a different one of a plurality of second recording media, the first recording medium storing the first main content, a decryption key for sub-content pertaining to the first recording medium, an encryption key for sub-content pertaining to the first recording medium, and a plurality of encryption keys for sub-content pertaining to the plurality of second recording media, and each of the second recording media storing a second corresponding main content and a decryption key for sub-content pertaining to the corresponding second recording medium, the contents playback program comprising:

a first reading step of reading the decryption key for sub-content pertaining to the first recording medium from the first recording medium, or reading the decryption key for sub-content pertaining to the second recording medium from the second recording medium;

a second reading step of reading, from the memory card storing encrypted sub-content and a plurality of encrypted sub-content keys, the encrypted sub-content and from among the encrypted sub-content keys stored in the memory card, one of the plurality of encrypted sub-content keys corresponding to the mounted recording medium;

a first decryption step of decrypting, with use of the read decryption key, the encrypted sub-content key read from the memory card, to generate a decrypted sub-content key;

a second decryption step of decrypting, with use of the generated decrypted sub-content key, the encrypted sub-content read from the memory card, to generate decrypted sub-content; and a playback step of playing back the generated decrypted sub-content.

* * * * *